(12) United States Patent
Sung et al.

(10) Patent No.: US 10,447,997 B2
(45) Date of Patent: Oct. 15, 2019

(54) ELECTRONIC DEVICE FOR CONTROLLING DEPTH SENSORS BASED ON EXTERNAL OBJECT AND METHOD THEREOF

(71) Applicant: SAMSUNG ELECTRONICS CO., LTD., Suwon-si, Gyeonggi-do (KR)

(72) Inventors: Kisuk Sung, Yongin-si (KR); Yongchan Keh, Seoul (KR); Yongkwan Kim, Suwon-si (KR); Sungsoon Kim, Seoul (KR); Hyo-Won Kim, Bucheon-si (KR); Byeonghoon Park, Suwon-si (KR); Jungkee Lee, Osan-si (KR); Kihuk Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 141 days.

(21) Appl. No.: 15/417,563

(22) Filed: Jan. 27, 2017

(65) Prior Publication Data

US 2017/0223337 A1     Aug. 3, 2017

(30) Foreign Application Priority Data

Feb. 2, 2016 (KR) .................. 10-2016-0012795

(51) Int. Cl.
*H04N 13/20* (2018.01)
*H05B 37/02* (2006.01)
(Continued)

(52) U.S. Cl.
CPC ............. *H04N 13/25* (2018.05); *G01S 7/484* (2013.01); *G01S 7/497* (2013.01); *G01S 7/4911* (2013.01);
(Continued)

(58) Field of Classification Search
CPC .... H04N 13/25; H04N 13/271; H04N 13/243; H04N 13/254; H04N 13/296;
(Continued)

(56) References Cited

U.S. PATENT DOCUMENTS 6,868,362 B1 * 3/2005 Oda .................... G01C 3/10
                                                        702/127
8,395,620 B2 3/2013 El Dokor et al.
(Continued)

FOREIGN PATENT DOCUMENTS

KR    10-2015-0014290     2/2015

*Primary Examiner* — Susan E. Hodges
(74) *Attorney, Agent, or Firm* — Nixon & Vanderhye P.C.

(57) ABSTRACT

A method and apparatus of example embodiments are related to photographing using a plurality of sensors in an electronic device. The electronic device includes a plurality of output units comprising output circuitry configured to output an identification signal to an external object, a sensor configured to acquire an identification signal that is a reflection of the identification signal from an external object, and a processor. The processor is configured to determine a first state of the external object, based on the reflected identification signal, to designate the plurality of output units as a first subset and a second subset, based at least on the first state of the external object, and to differently control the first subset and the second subset to output the identification signal.

8 Claims, 30 Drawing Sheets

(51) Int. Cl.
　　*G06F 3/01*　　　(2006.01)
　　*G06T 7/50*　　　(2017.01)
　　*H04N 13/25*　　 (2018.01)
　　*G06T 7/521*　　 (2017.01)
　　*G01S 17/02*　　 (2006.01)
　　*G01S 17/66*　　 (2006.01)
　　*G01S 17/89*　　 (2006.01)
　　*G01S 7/484*　　 (2006.01)
　　*G01S 7/497*　　 (2006.01)
　　*G01S 7/491*　　 (2006.01)
　　*H04N 13/243*　　(2018.01)
　　*H04N 13/254*　　(2018.01)
　　*H04N 13/271*　　(2018.01)
　　*H04N 13/296*　　(2018.01)
　　*G01S 17/08*　　 (2006.01)

(52) U.S. Cl.
　　CPC ............ *G01S 17/023* (2013.01); *G01S 17/66* (2013.01); *G01S 17/89* (2013.01); *G06T 7/521* (2017.01); *H04N 13/243* (2018.05); *H04N 13/254* (2018.05); *H04N 13/271* (2018.05); *H04N 13/296* (2018.05); *G01S 17/08* (2013.01); *G06T 2207/10028* (2013.01)

(58) Field of Classification Search
　　CPC ........ G01S 17/023; G01S 17/66; G01S 7/497; G01S 17/89; G01S 7/484; G01S 7/4911; G01S 17/08; G06T 7/521; G06T 2207/10028
　　USPC .......................................................... 348/47
　　See application file for complete search history.

(56) References Cited

U.S. PATENT DOCUMENTS

| | | | |
|---|---|---|---|
| 9,098,931 B2 | 8/2015 | Shpunt et al. | |
| 9,336,440 B2* | 5/2016 | Ramachandran | G06K 9/00624 |
| 2014/0267631 A1* | 9/2014 | Powers | H04N 5/23241 |
| | | | 348/47 |
| 2015/0131852 A1 | 5/2015 | Sweetser et al. | |
| 2016/0178991 A1* | 6/2016 | Wan | G03B 15/05 |
| | | | 348/169 |

* cited by examiner

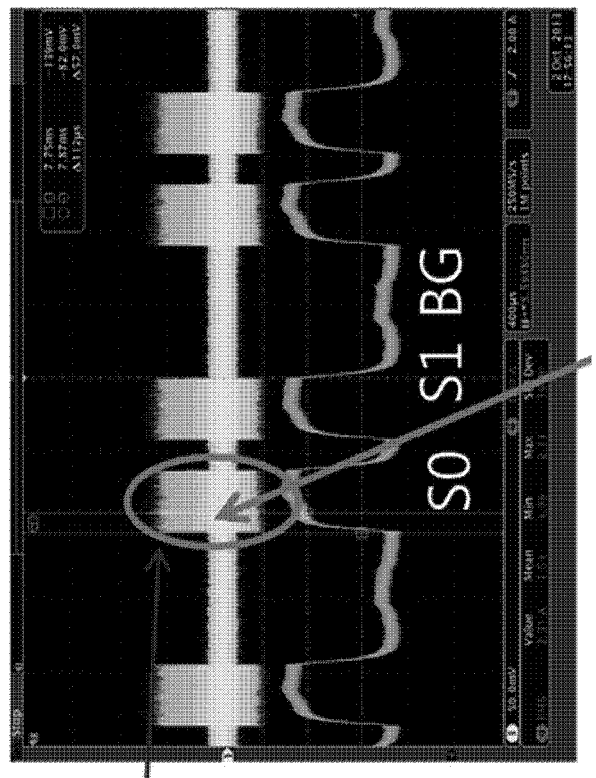
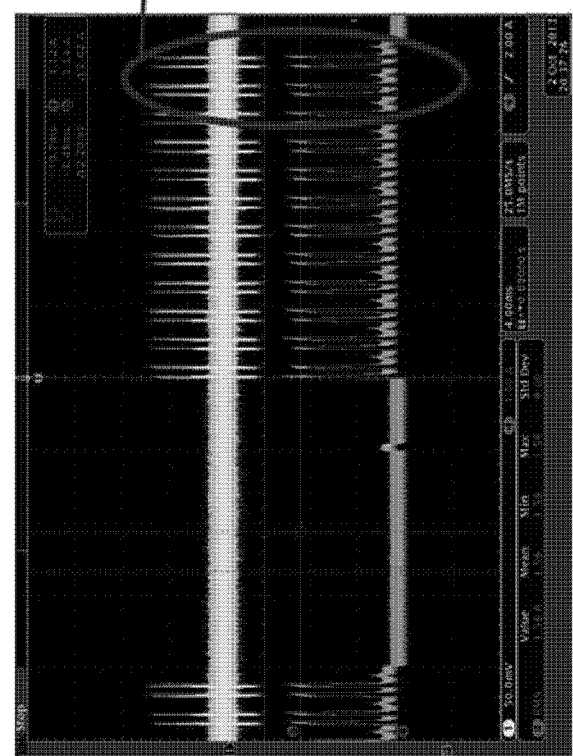
FIG. 29

ELECTRONIC DEVICE FOR CONTROLLING DEPTH SENSORS BASED ON EXTERNAL OBJECT AND METHOD THEREOF

CROSS REFERENCE TO RELATED APPLICATION

The present application is based on and claims priority under 35 U.S.C. § 119 to Korean Application Serial No. 10-2016-0012795, which was filed in the Korean Intellectual Property Office on Feb. 2, 2016, the content of which is incorporated by reference herein in its entirety.

BACKGROUND

1. Field of the Disclosure

The present disclosure relates generally to a method and apparatus for photographing using a plurality of sensors in a photographing device (e.g., a depth camera) or an electronic device including the photographing device.

2. Description of Related Art

With the recent growth of digital technologies, various types of electronic devices are being widely used such as mobile communication terminals, smart phones, tablet Personal Computers (PCs), Personal Digital Assistants (PDAs), electronic organizers, notebook computers, wearable devices, digital cameras, Internet of Things (IoT) devices, game devices, audible devices, etc.

In recent years, a 3-Dimensional (3D) camera (e.g., a depth camera) capable of photographing a 3-dimensional image or an electronic device (hereinafter, referred to as a depth camera device) including the same is being provided. The depth camera device is being commonly used in various fields requiring user's body recognition, face recognition, etc., as well as 3-dimensional image photographing. For example, the depth camera device can recognize a movement (or motion) of the body of a user (e.g., a body, a face, a hand, a finger, etc.) and provide depth information (or distance information). This depth camera device can be commonly divided into a Time Of Flight (TOF) scheme and an Infrared (IR) pattern scheme.

The TOF scheme can refer to a scheme of determining a distance to a subject through a TOF sensor and photographing a depth image. The TOF sensor can determine the distance to the subject by measuring a time taken until Infrared (IR) is reflected and returned from the subject after being transmitted to the subject in a plurality of cells each having an array of a light emitting unit and a light receiving unit. The TOF scheme can employ an algorithm of simply measuring only a distance, and has an advantage that its structure is simple and image processing is fast.

The IR pattern scheme (i.e., structured light scheme) can refer to a scheme of photographing a depth image by irradiating IR into a subject in a certain pattern and recognizing a shape of a thing corresponding to the irradiated IR pattern.

As a conventional depth camera device uses a camera of a fixed viewing angle and uses power of a fixed IR light source including the coverage thereof, even an unnecessary region other than a region where a subject exists actually is included in an IR light source projection region. So, the conventional depth camera device has a problem in which power efficiency is deteriorated. For example, the depth camera device or a system utilizing the depth camera device can cause unnecessary power consumption because irradiating a certain IR light source in no consideration of a viewing angle dependent on a use distance. Further, in a mobile device, a battery power consumption issue is of much significance. So, this existing indoor system can be very difficult to be applied to the mobile device.

SUMMARY

Various example embodiments disclose a method and apparatus capable of adaptively controlling power according to sensor use, corresponding to depth information (e.g., location and/or distance) of an object.

Various example embodiments disclose a method and apparatus capable of decreasing the power consumption of a system, through adaptive power control based on depth information of an object.

Various example embodiments disclose a method and apparatus capable of efficiently managing power consumption resulting from IR light source irradiation, in an electronic device mounting a mobile depth camera.

An electronic device according to various example embodiments of the present disclosure may include a plurality of output units comprising output circuitry configured to output an identification signal to an external object, a sensor configured to acquire an identification signal based on a reflection of the identification signal from an external object, and a processor. The processor can be configured to determine a first state of the external object, based at least on the reflected identification signal, and to designate the plurality of output units as a first subset and a second subset, based at least on the first state of the external object, and to differently control the first subset and the second subset to output the identification signal.

An electronic device according to various example embodiments of the present disclosure may include a camera, a plurality of depth sensors operatively coupled with the camera, and a processor operatively coupled with the camera and the depth sensors. The processor can be configured to detect an object external to the electronic device, to generate depth information related to the external object, using at least some of the plurality of depth sensors, to select at least one of the plurality of depth sensors as a first sensor set to detect the object, based on at least a part of the depth information, to select another at least one of the plurality of depth sensors as a second sensor set to refrain from detecting the object, and to output data of the first sensor set and the second sensor set, using mutually different power.

A method for operating an electronic device according to various example embodiments of the present disclosure may include operations comprising outputting an identification signal to an external object, based on at least one of a plurality of output units, acquiring an identification signal based on a reflection of the identification signal from an external object through a sensor, determining a first state of the external object based at least on the reflected identification signal, and designating the plurality of output units as a first subset and a second subset, based at least on the first state of the external object, and mutually differently controlling the first subset and the second subset to output the identification signal.

To address the above drawbacks, various example embodiments of the present disclosure can include a computer-readable recording medium recording a program for executing the method in a processor.

A recording medium according to various example embodiments of the present disclosure can include a non-transitory computer-readable recording medium recording a program for executing the operations comprising outputting an identification signal to an external object based on at least one of a plurality of output units, acquiring an identification signal comprising a reflection of the identification signal from the external object through a sensor, determining the first state of the external object based at least on the reflected identification signal, designating the plurality of output units as a first subset and a second subset based at least on the first state of the external object, and mutually differently controlling the first subset and the second subset to second output the identification signal.

BRIEF DESCRIPTION OF THE DRAWINGS

The above and other aspects, features and attendant advantages of the present disclosure may be more readily appreciated and understood from the following detailed description, taken in conjunction with the accompanying drawings, in which like reference numerals refer to like elements, and wherein:

FIG. 25, FIG. 26, FIG. 27, FIG. 28A, FIG. 28B, FIG. 29 and FIG. 30 are diagrams illustrating examples of a simulation result in an electronic device according to various example embodiments of the present disclosure.

DETAILED DESCRIPTION

Figure 1:
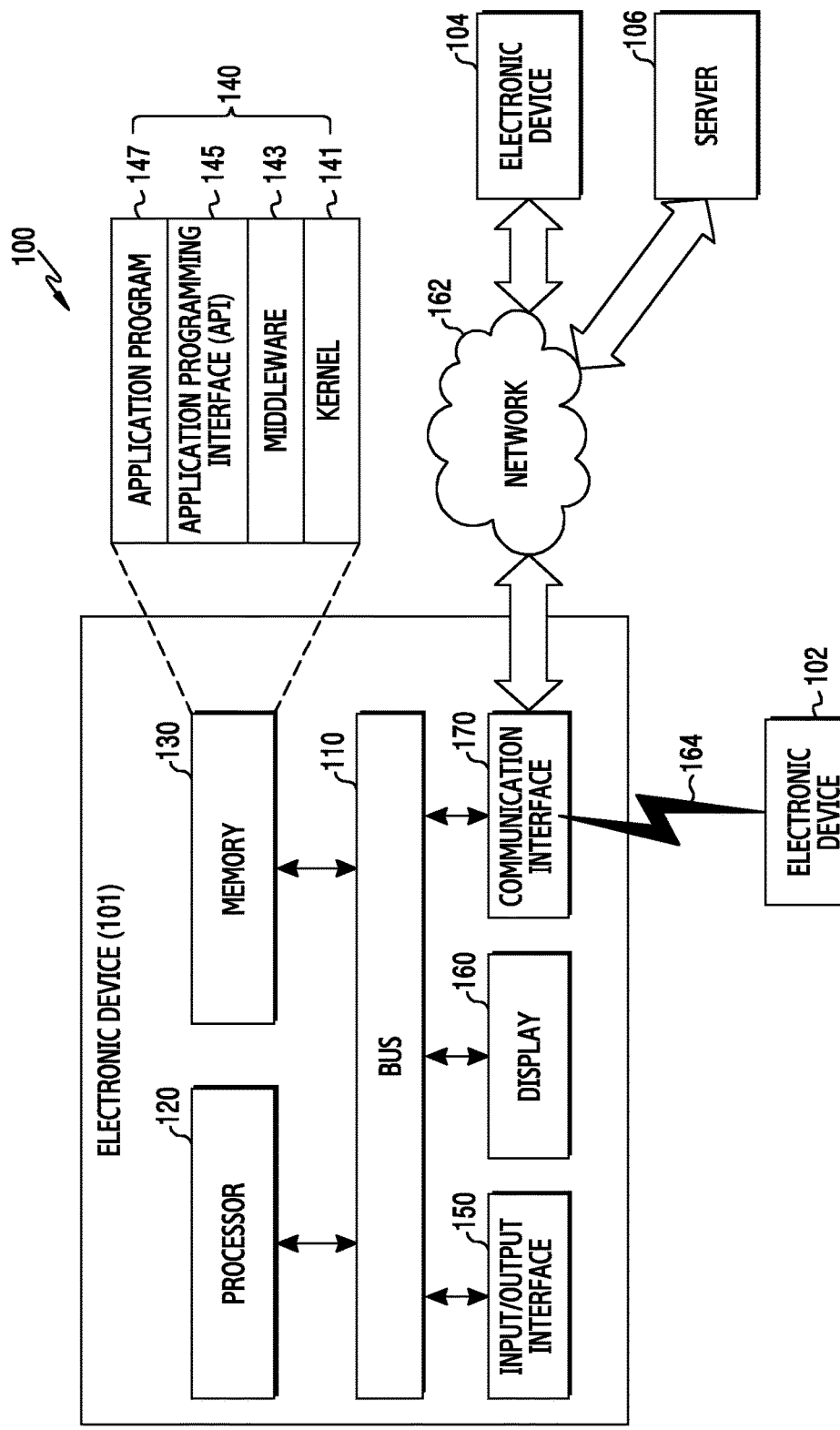
FIG. 1 is a diagram illustrating a network environment including an example electronic device according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. In some situations, the expression "device configured to" may refer to a situation in which the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an example electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various circuitry configured to function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry configured to establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
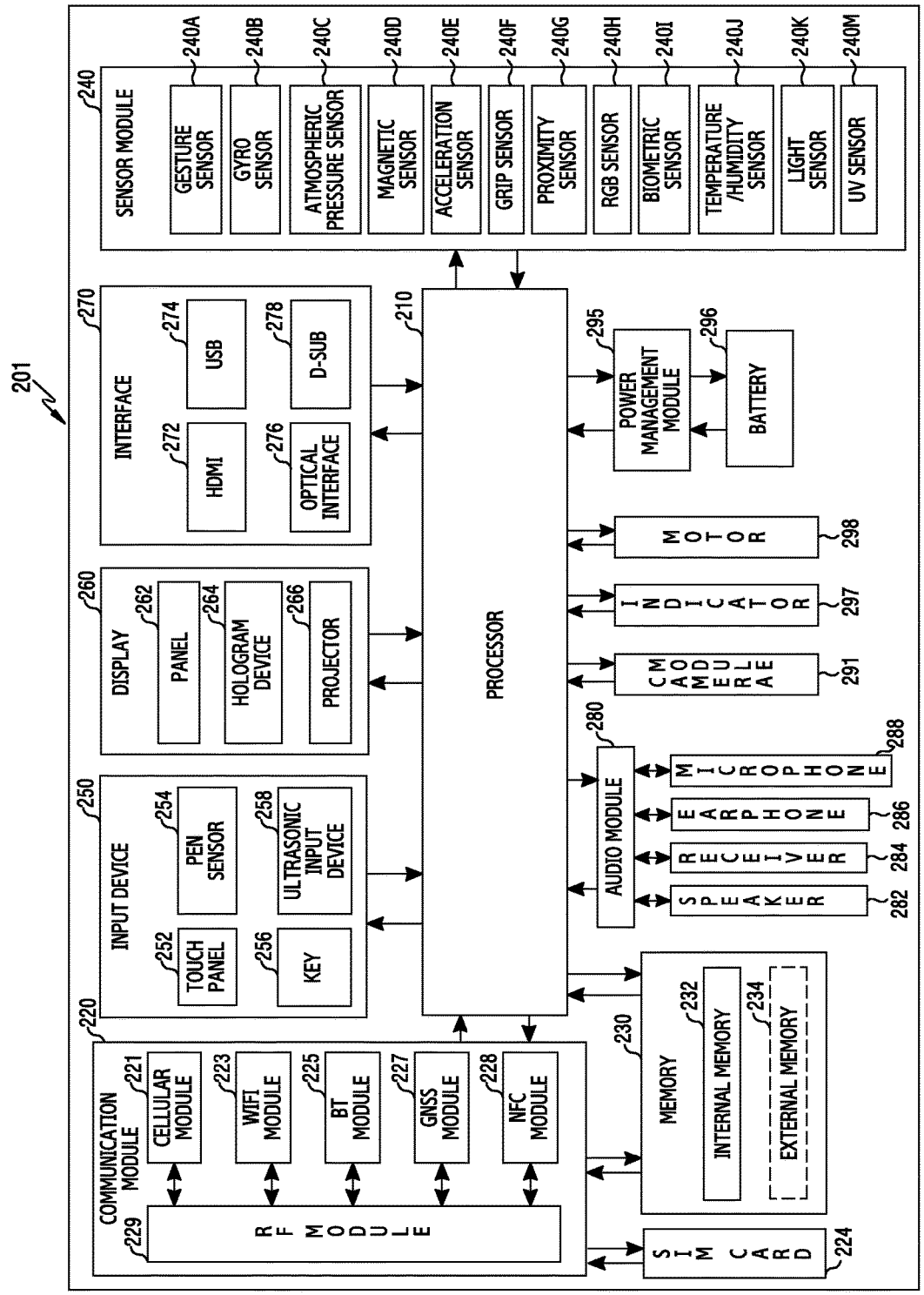
FIG. 2 is a block diagram illustrating an example electronic device according to various example embodiments.

FIG. 2 is a block diagram illustrating an example electronic device according to various example embodiments of the present disclosure.

The electronic device 201 may include, for example, all or a part of the electronic device 101 shown in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry, such as, for example, and without limitation, a touch panel, a physical key, a proximity sensor, a bio sensor, etc.) 250, a display 260, an interface (e.g., including interface circuitry) 270, an audio module 280, a camera module 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
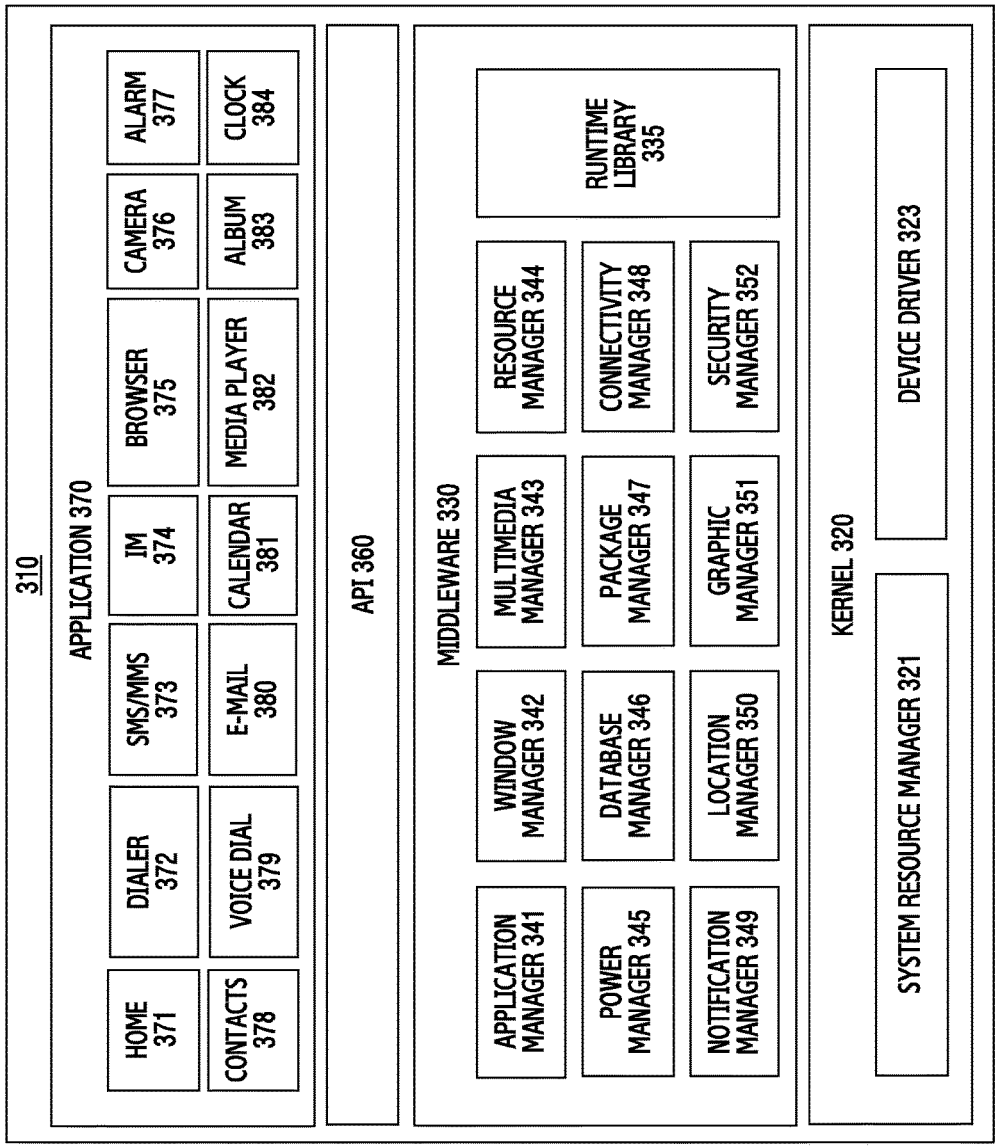
FIG. 3 is a block diagram illustrating an example program module according to various example embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock (or watch) 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Various example embodiments of the present disclosure disclose a method and apparatus capable of decreasing power consumption in a device (e.g., depth camera) capable of photographing a 3-Dimensional (3D) image (or a depth image) or an electronic device including the photographing device. For example, various example embodiments disclose a method and apparatus capable of efficiently managing power consumption resulting from IR light source irradiation in an electronic device mounting a mobile depth camera.

According to various example embodiments, the electronic device can, for example, include a camera module having a 1st camera (e.g., a depth camera) photographing a 3-dimensional image and a 2nd camera (e.g., a color camera (e.g., a Red, Green, Blue (RGB) camera)) photographing a color image (e.g., an RGB image), or include the 1st camera and the 2nd camera separately.

According to various example embodiments, the electronic device can, for example, include a plurality of depth sensors (e.g., IR sensors) operatively interworking with the 1st camera or the 2nd camera. According to one example embodiment, the depth sensor can be operatively coupled with the 1st camera. According to another example embodiment, the depth sensor can be operatively coupled with the 1st camera and the 2nd camera. According to various example embodiments, the depth sensor can be included in the 1st camera as well.

According to various example embodiments, the electronic device can recognize (determine) user's depth information (or distance information) (e.g., location and/or motion information), based on any one construction mentioned earlier. According to various example embodiments, the electronic device can adaptively control a light source of a depth sensor correspondingly to the user's depth information. Through this, the electronic device can decrease the power consumption of the whole system resulting from 3-dimensional image photographing. Various example embodiments disclose that, based on any one construction mentioned earlier, the electronic device analyzes user's motion (e.g., hand motion, body motion, etc.) information and distance information and, based on at least a part of the analyzed information, the electronic device efficiently manages power for light source irradiation of a depth sensor. For example, in a conventional system utilizing a depth camera, light source power of a depth sensor suddenly increases according to a distance, so a rate of occupation of the power of the depth sensor (e.g., IR light source unit) among the entire power of the system can be very large. Accordingly, various example embodiments disclose decreasing power consumption resulting from light source irradiation of the depth sensor.

According to various example embodiments, the depth sensor can be implemented in various array structures. Among a depth sensor array, at least one depth sensor can output a light source correspondingly to user's depth information (or distance information) (e.g., location and/or movement information), and the depth sensor outputting the light source can output the light source at different power in accordance with the depth information. Various example embodiments of the present disclosure are not limited to this, and other various example embodiments are possible.

An electronic device according to various example embodiments of the present disclosure supports a function of 3-dimensional image photographing. The electronic device can include all devices using one or more of a diversity of processors such as an Application Processor (AP), a Communication Processor (CP), a Graphic Processing Unit (GPU), a Central Processing Unit (CPU), etc. For example, the electronic device according to various example embodiments can include all information communication devices, multimedia devices, wearable devices, Internet of Things (IoT) devices, or appliances thereof, supporting the function of 3-dimensional image photographing.

An operation method and apparatus according to various example embodiments of the present disclosure are described below with reference to the accompanying drawings. However, in that the various example embodiments of the present disclosure are not limited or restricted by the following description, it should be noted that the various example embodiments of the present disclosure are applicable to various example embodiments on the basis of the following example embodiment. In various example embodiments of the present disclosure described below, a hardware access method is described as an example. However, since the various example embodiments of the present disclosure include a technology using all of hardware and software, the various example embodiments of the present disclosure do not exclude a software based access method.

Figure 4:
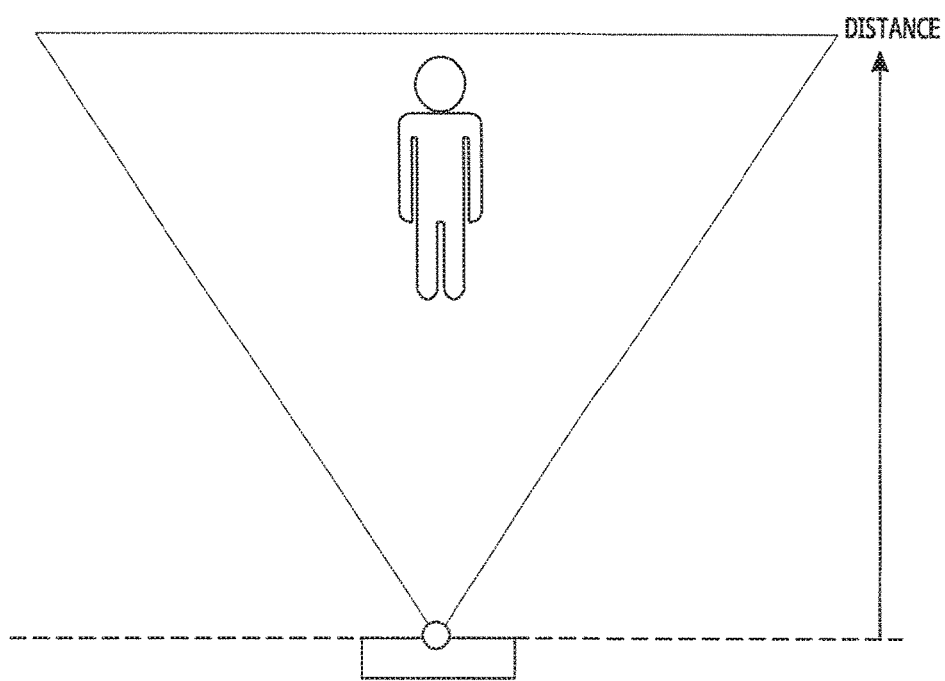
FIG. 4, FIG. 5 and FIG. 6 are diagrams illustrating an example operation according to various example embodiments of the present disclosure.
Figure 5:
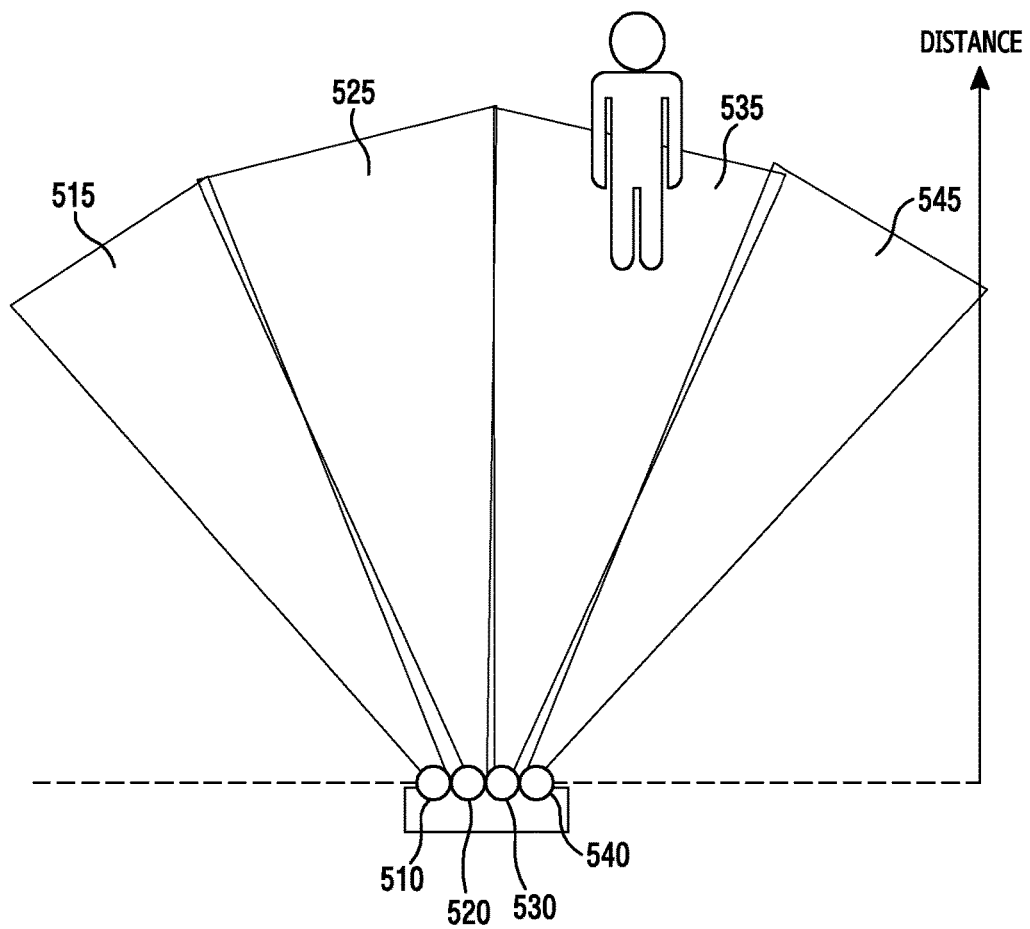
Figure 6:
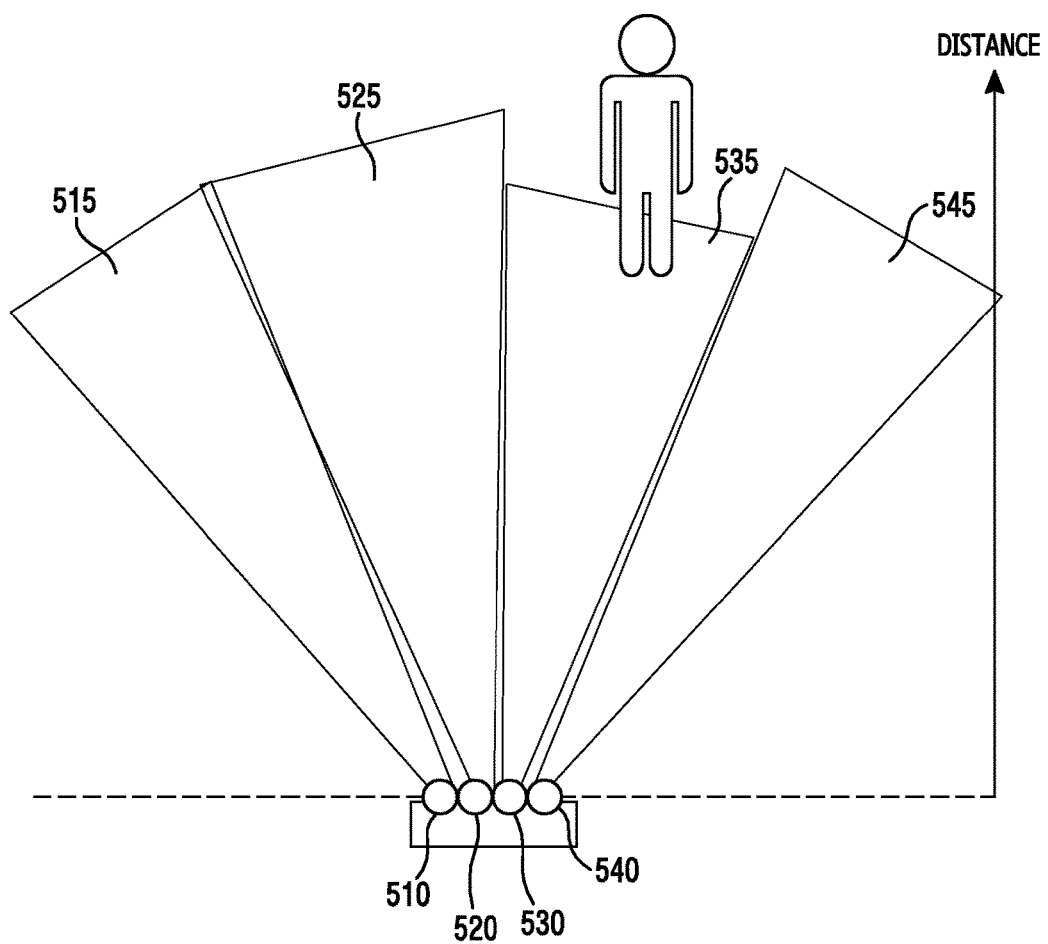

FIG. 4, FIG. 5 and FIG. 6 are diagrams illustrating an example operation according to various example embodiments of the present disclosure.

FIG. 4 illustrates an example of photographing a 3-dimensional image in a conventional electronic device, and FIG. 5 illustrates an example of photographing a 3-dimensional image in an electronic device according to various example embodiments of the present disclosure.

As illustrated in FIG. 4, the conventional electronic device configures coverage for recognizing a user location and motion, using a depth camera having one depth sensor. For example, the conventional electronic device recognizes a user or a user motion, using one depth sensor (e.g., an IR sensor, an ultrasonic sensor, a laser, a light sensor, etc.). In case where the conventional electronic device is designed to cover a wide viewing angle by one depth sensor (e.g., IR sensor), the conventional electronic device has a problem in which light (e.g., infrared light) between the center of viewing angle coverage and an edge thereof is made non-uniform, and the performance (e.g., a depth accuracy, etc.) of the whole system is deteriorated. Also, the conventional electronic device fixedly uses certain power (e.g., the maximum power) for the maximum coverage (e.g., distance) of a depth sensor in no consideration of a distance (e.g., user's location) between a depth camera and a user, so the conventional electronic device can cause unnecessary power consumption even at a close distance from the user.

As illustrated in FIG. 5, the electronic device according to various example embodiments of the present disclosure can distinguish (divide) and configure coverage for recognizing a user location and motion, using a depth camera with a plurality of depth sensors. For example, in various example embodiments, the electronic device can be configured to have directivity in a different direction every plurality of (e.g., at least two or more) depth sensors. According to one example embodiment, the electronic device can set coverage in which boundaries are adjacent to each other, however, are not mutually overlapped or are partially overlapped, every depth sensor, and can be configured in a beamforming scheme such that each depth sensor covers the set coverage. In various example embodiments, the depth sensor can, for example, include an IR sensor, an ultrasonic sensor, a laser, a light sensor, etc.

According to various example embodiments, the electronic device can detect user's depth information (e.g., a location and a distance) at the maximum power through a plurality of depth sensors. According to various example embodiments, if the user's depth information is detected, the electronic device can decrease power for light source irradiation (e.g., set the power by the minimum power) of another depth sensor (e.g., an adjacent depth sensor and/or a spaced depth sensor) excluding a sensor corresponding to the detected depth information (e.g., a depth sensor of a region where a user is detected). Or, the electronic device can cut off power supply to the another depth sensor.

According to one example embodiment, as illustrated in FIG. 5, it can be assumed that the depth camera consists of four depth sensors (e.g., a 1st depth sensor 510, a 2nd depth sensor 520, a 3rd depth sensor 530, and/or a 4th sensor 540). As in the example of FIG. 5, the 1st depth sensor 510 can form (e.g., beamform) a 1st region 515 at 1st directivity, and the 2nd depth sensor 520 can form (e.g., beamform) a 2nd region 525 at 2nd directivity, and the 3rd depth sensor 530 can form (e.g., beamform) a 3rd region 535 at 3rd directivity, and the 4th depth sensor 540 can form (e.g., beamform) a 4th region 545 at 4th directivity. The example of FIG. 5 illustrates a case where a user is located in the 3rd region 535 of the 3rd depth sensor 530.

According to various example embodiments, if the electronic device detects that the user is located in the 3rd region 535, the electronic device can set (e.g., control of a pulse width and/or electric current, and/or turn-On/turn-Off of a certain period) the minimum power to adjacent depth sensors (or for adjacent regions adjacent to a user region where the user is located) (e.g., the 2nd depth sensor 520 and/or the 4th depth sensor 540) adjacent to the 3rd depth sensor 530 for the 3rd region 535, and can turn Off a spaced depth sensor (e.g., the 1st depth sensor 510) spaced apart from the 3rd depth sensor 530 (or for a spaced region excluding the user region and the adjacent region).

According to various example embodiments, if the electronic device detects a distance from the user in the 3rd region 535, the electronic device can adjust power of the 3rd depth sensor 530 for the 3rd region 535 in accordance with the user distance. For example, as illustrated in FIG. 6, the 3rd depth sensor 530 can be set to output a light source at less power, not the maximum power, based on the user distance. According to various example embodiments, in case where the distance belongs to a 1st distance, the 3rd depth sensor 530 can output a light source at 1st power corresponding to 1st coverage. In case where the distance belongs to a 2nd distance, the 3rd depth sensor 530 can output a light source at 2nd power corresponding to 2nd coverage. For example, in case where the 1st distance is less than the 2nd distance (e.g., the 1st distance<the 2nd distance) between the electronic device (or depth camera) and the user, the 1st power can be set less than the 2nd power (e.g., the 1st power<the 2nd power).

According to various example embodiments, the electronic device can set an adjacent depth sensor (e.g., the 2nd depth sensor 520 and/or the 4th depth sensor 540) by the maximum power to cover the maximum region every certain period, and detect the entry, etc. of another user. According to various example embodiments, the electronic device can predict a movement direction of a user and set a corresponding depth sensor and power adaptively.

As described above, a conventional light source power adjustment scheme works in a fixed manner, but a light source power adjustment scheme according to various example embodiments of the present disclosure can work in a variable manner. For example, a system can determine light source power dependent on a distance, e.g., absolutely required minimum power and, in aspect of power consumption, it can be inefficient that the light source power is fixedly turned on even in a void region where there is not a user. So, in various example embodiments, the electronic device can decrease the coverage of a depth sensor for the void region where there is not the user, and control light source irradiation by only the minimum power, thereby decreasing the power consumption. According to various example embodiments, after the electronic device determines a region where the user is located and detects a distance from the user, the electronic device can control power to the extent of satisfying a power threshold corresponding to the corresponding distance, thereby decreasing the power consumption. For example, in various example embodiments, the electronic device can adaptively (or variably) control power required for light source output of the depth sensor.

Also, in various example embodiments, the electronic device can figure out a user's motion in advance, and support a previous preparation operation in such a scheme of handover to an adjacent light source array (e.g., an adjacent depth sensor), thereby optimizing the power consumption concurrently with considering a user's movement.

Additionally or alternatively, in various example embodiments, in case where the electronic device combines a Dynamic Vision Sensor (DVS), when predicting a user movement pattern, the electronic device can also implement performance optimized for determining a user movement, without an increase of an additional determination quantity, a latency, etc. Also, according to various example embodiments, the uniformity between an edge portion of the whole light emitting region consisting of a light array (e.g., IR sensor) and the center thereof gets better, thereby being capable of enhancing the performance of the whole system.

Figure 7:
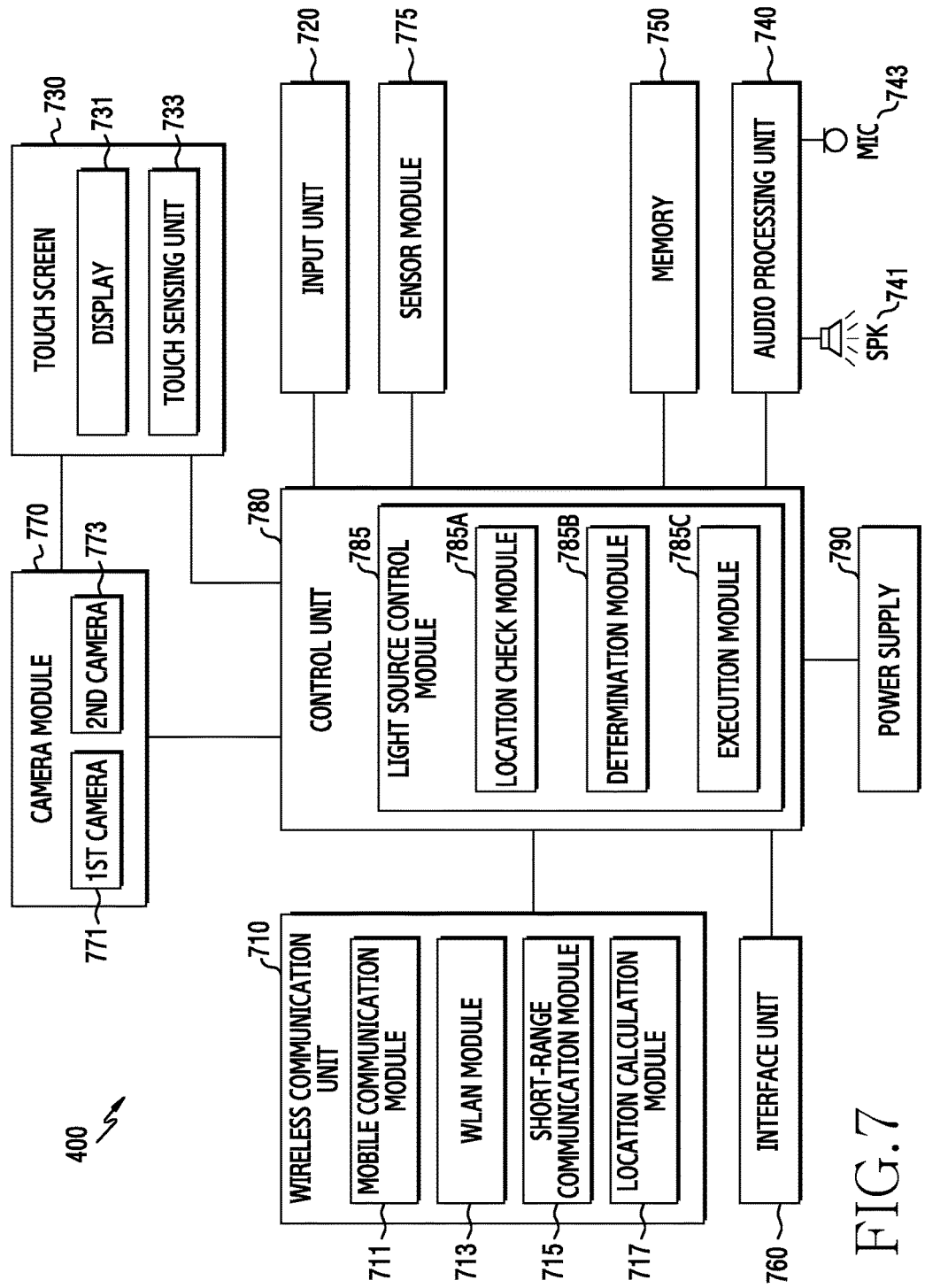
FIG. 7 is a block diagram illustrating an example electronic device according to various example embodiments of the present disclosure.

FIG. 7 is a block diagram illustrating an example construction of an example electronic device according to various example embodiments of the present disclosure.

Referring to FIG. 7, the electronic device 400 according to various example embodiments of the present disclosure can, for example, include a wireless communication unit (e.g., including communication circuitry) 710, an input unit (e.g., including input circuitry) 720, a touch screen 730, an audio processing unit 740, a memory 750, an interface unit (e.g., including interface circuitry) 760, a camera module 770, a sensor module 775, a control unit (e.g., including processing circuitry) 780 (e.g., the processor 120), and a power supply 790. In various example embodiments of the present disclosure, the constituent elements illustrated in FIG. 7 are not essential, so the electronic device 400 can be implemented to have constituent elements more than the constituent elements illustrated in FIG. 7 or have constituent elements less than the constituent element illustrated in FIG. 7.

The wireless communication unit 710 can, for example, have the same or similar construction with the communication module 220 of FIG. 2. The wireless communication unit 710 can include one or more modules enabling wireless communication between the electronic device 200 and another external electronic device (e.g., the electronic device 102 or 104, or the server 106). For example, the wireless communication unit 710 can include various communication circuitry, such as, for example, and without limitation, a mobile communication module 711, a Wireless Local Area Network (WLAN) module 713, a short-range communication module 715, a location calculation module 717, etc. In various example embodiments, the wireless communication unit 710 can include a module (e.g., a short-range communication module, a long-range communication module, etc.) for performing communication with a peripheral external electronic device.

The mobile communication module 711 can, for example, have the same or similar construction with the cellular module 221 of FIG. 2. The mobile communication module 711 can transceive a wireless signal with at least one of a base station, an external electronic device (e.g., another electronic device 104), and various servers on a mobile communication network. In accordance with various example embodiments, the server can, for example, include at least one of an application server, a management server, an integration server, a provider server, a content server, an Internet server, a cloud server, etc. The wireless signal can include a voice signal, a data signal, or control signals of various forms. In response to a user request, the mobile communication module 711 can transmit various data, which are necessary for an operation of the electronic device 400, to an external device (e.g., the server 106, the another electronic device 104, etc.).

The wireless LAN module 713 can, for example, have the same or similar construction with the WiFi module 223 of FIG. 2. The wireless LAN module 713 can refer to a module for performing wireless Internet access and forming a wireless LAN link with another external electronic device (e.g., the another electronic device 102, the server 106, etc.). The wireless LAN module 713 can be built in or built outside the electronic device 400. A wireless Internet technology can be WiFi (Wireless Fidelity), Wibro (Wireless broadband), WiMax (World interoperability for Microwave access), HSDPA (High Speed Downlink Packet Access), mmWave (millimeter Wave), etc. The wireless LAN module 713 can interwork with another external electronic device (e.g., another electronic device 102, etc.) coupled with the electronic device 400 through a network (e.g., a wireless Internet network) (e.g., the network 162), and transmit various data of the electronic device 400 to the external electronic device or receive data from the external electronic device. The wireless LAN module 713 can maintain a full-time ON state, or turn-On/turn-Off in accordance with setting of the electronic device 400 or a user input.

The short-range communication module 715 can refer to a module for performing short-range communication. A short-range communication technology can be Bluetooth, Bluetooth Low Energy (BLE), Radio Frequency IDentification (RFID), Infrared Data Association (IrDA), Ultra Wide-Band (UWB), ZigBee, Near Field Communication (NFC), etc. The short-range communication module 715 can interwork with another external electronic device coupled with the electronic device 400 through a network (e.g., short-range communication network), and transmit various data of the electronic device 400 to the external electronic device or receive data from the external electronic device. The short-range communication module 715 can maintain a full-time ON state, or turn-on/turn-off in accordance with setting of the electronic device 400 or a user input.

The location calculation module 717 can, for example, have the same or similar construction with the GNSS module 227 of FIG. 2. The location calculation module 717, a module for acquiring a location of the electronic device 400, can include a GPS module as a typical example. The location calculation module 717 can measure a location of the electronic device 400 by the principle of triangulation.

In response to receiving an input, the input unit 720 can generate input data for control of an operation of the electronic device 400. The user input unit 720 can include various input circuitry, such as, for example, at least one input device for detecting various inputs of a user. For example, the input unit 720 can include various input circuitry, such as, for example, and without limitation, a key pad, a dome switch, a physical button, a touchpad (constant voltage/constant current), a jog shuttle, a sensor (e.g., the sensor module 240), etc.

The input unit 720 can be partially implemented in the form of a button outside the electronic device 400, and can be partially or wholly implemented as a touch panel as well. The input unit 720 can receive a user input for initiating an operation (e.g., a 3-dimensional image photographing function, a user recognition function, etc.) of the electronic device 400 according to various example embodiments of the present disclosure, and can generate an input signal according to the user input.

The touch screen 730 refers to an input/output device capable of performing an input function and a display function concurrently. The touch screen 730 can include a display 731 (e.g., the display 160 and/or 260) and a touch sensing unit 733. The touch screen 730 can provide an input/output interface between the electronic device 400 and a user, and can forward a user's touch input to the electronic device 400, and can include a medium role of showing the output of the electronic device 400 to the user. The touch screen 730 can show a visual output to the user. The visual output can be shown in the form of a text, a graphic, a video, and a combination of them.

The display 731 can display (output) a variety of information processed in the electronic device 400. For example, the display 731 can display a User Interface (UI) or Graphical UI (GUI) related with an operation of performing 3-dimensional image photographing by the electronic device 400, an operation of displaying various information related with a 3-dimensional image, an operation of displaying execution result information according to 3-dimensional image recognition, etc. The display 731 can employ various displays (e.g., the display 160).

In various example embodiments, the display 731 can include a flat type display, or a bended display (or curved display) capable of curving or bending or rolling a thin and flexible substrate without damage, like paper. The bended display can be assembled to a housing of the electronic device 400 (or a body including a construction of the electronic device 400) and maintain a bended shape. In various example embodiments, the electronic device 400 can be also implemented as a display device capable of being freely bent and unbent like a flexible display, inclusive of a type such as the bended display. In various example embodiments, the display 731 can provide flexibility making foldable, by substituting a plastic film for a glass substrate encompassing a liquid crystal in a Liquid Crystal Display (LCD), a Light Emitting Diode (LED), an Organic LED (OLED), an Active Matrix OLED (AMOLED), etc.

The touch sensing unit 733 can be safely mounted in the display 731. The touch sensing unit 733 can sense a user input getting in touch with or coming close to a surface of the touch screen 730. The user input can include a touch event or proximity event that is inputted based on at least one of single-touch, multi-touch, hovering, or air gesture. In various example embodiments, the touch sensing unit 733 can receive a user input for initiating an operation (e.g., a 3-dimensional image photographing function, a user recognition function, etc.) related with the use of the electronic device 400. The touch sensing unit 733 can generate an input signal according to the user input. In accordance with various example embodiments of the present disclosure, the touch sensing unit 733 can be configured to convert a change of a pressure applied to a specific portion of the display 731, or capacitance, etc. generated in the specific portion of the display 731, into an electrical input signal. The touch sensing unit 733 can detect a location and area in which an input tool (e.g., a user finger, an electronic pen, etc.) gets in touch with or comes close to a surface of the display 731. Also, the touch sensing unit 733 can be implemented to detect even a touch pressure (e.g., force touch) in accordance with a touch scheme applied.

The audio processing unit 740 can, for example, have the same or similar construction with the audio module 280 of FIG. 2. The audio processing unit 740 can perform a function of transmitting an audio signal inputted from the control unit 780, to a speaker 741, and forwarding an audio signal such as a voice, etc. inputted from a microphone 743, to the control unit 780. The audio processing unit 740 can convert voice/sound data into an audible sound through the speaker 741 under the control of the control unit 780 to output the audible sound. The audio processing unit 740 can convert an audio signal such as a voice, etc. received from the microphone 743, into a digital signal, and forward the digital signal to the control unit 780.

The speaker 741 can output audio data that is received from the wireless communication unit 710 or stored in the memory 750. The speaker 741 can output a sound signal related with various operations (functions) carried out in the electronic device 400 as well.

The microphone 743 can receive an input of an external sound signal and process the received sound signal into electrical voice data. The microphone 743 can implement a diversity of noise reduction algorithms for reducing a noise generated in a process of receiving the input of the external sound signal. The microphone 743 can take charge of inputting audio streaming such as a voice command (e.g., a voice command for initiating functions of 3-dimensional image photographing, user recognition, camera module 770 turn-on/turn-off, etc.), etc.

The memory 750 (e.g., the memory 130 and/or 230) can store one or more programs executed by the control unit 780. The memory 750 (e.g., the memory 130 and/or 230) can perform a function for temporarily storing inputted/outputted data as well. The inputted/outputted data can, for example, include a file of a video, an image, a photo, an audio, etc. The memory 750 takes charge of a role of storing acquired data. Data acquired in real time can be stored in a temporary storage device (e.g., buffer), and data confirmed to be stored can be stored in a lasting storage device.

In various example embodiments, the memory 750 can store one or more programs, data or instructions. The one or more programs, data or instructions are related with that the control unit 780 (e.g., processor) controls to detect an object, using depth sensors, and generate depth information related with the detected object, and distinguish a plurality of depth sensors into depth sensors of a region used for the object detection and a region not used for the object detection, using the depth information, and set mutually different power to the distinguished depth sensors to output light sources.

In accordance with various example embodiments, the memory 750 can store one or more programs, data or instructions. The one or more programs, data or instructions are related with that the control unit 780 controls to turn Off power for light source output for a depth sensor of a region not used for object detection, and set power to correspond to depth information for a depth sensor of a region used for the object detection, and perform the object detection at the maximum power of the depth sensors, and acquire depth information of a detected object, and determine a 1st depth sensor of a region where the object is detected, based on the depth information, and set power of the 1st depth sensor determined based on the depth information.

In accordance with various example embodiments, the memory 750 can include one or more application modules (or software modules), etc. In various example embodiments, the memory 750 can include a computer-readable recording medium that records a program for executing in the processor (e.g., the control unit 780) a method according to the various example embodiments.

In accordance with various example embodiments, a recording medium can, for example, include a computer-readable recording medium that records a program for executing the operations of 1st outputting an identification signal to the external, based on at least one of a plurality of output units, and acquiring an identification signal that is a reflection of the identification signal from an external object, through a sensor, and determining the first state of the external object regarding the electronic device, based at least on the reflected identification signal, and designating the plurality of output units as a 1st subset and a 2nd subset, based at least on the first state of the external object, and mutually differently control the 1st subset and the 2nd subset to 2nd output the identification signal.

In accordance with various example embodiments, a recording medium can, for example, include a computer-readable recording medium that records a program for executing the operations of detecting an object by using depth sensors, and generating depth information related with the detected object, and distinguishing a plurality of depth sensors into depth sensors of a region used for the object detection and a region not used for the object detection by using the depth information, and setting mutually different power to the distinguished depth sensors, and performing light source output, based on the set power.

The interface unit 760 can, for example, have the same or similar construction with the interface 270 of FIG. 2. The interface unit 760 can receive data from another electronic device, or receive a supply of a power source and forward the power source to the respective elements of the electronic device 400. The interface unit 760 can transmit data of the electronic device 400 to another electronic device. For example, the interface unit 760 may include various interface circuitry, such as, for example, and without limitation, a wired/wireless headphone port, an external electric charger port, a wired/wireless data port, a memory card port, an audio input/output port, a video input/output port, an earphone port, etc.

The camera module 770 (e.g., the camera module 291) refers to a module supporting a photographing function of the electronic device 400. The camera module 770 may include more than one camera, and can photograph an arbitrary subject in accordance with the control of the control unit 780, and forward photographed data (e.g., image) to the display 731 and the control unit 780.

According to various example embodiments of the present disclosure, the camera module 770 can acquire 3-dimensional image photographing information and depth information. Additionally or alternatively, the camera module 770 can acquire color information. For example, the camera module 770 can include a 1st camera 771 (e.g., depth camera) for acquiring depth information, and a 2nd camera 773 (e.g., color camera) for acquiring color information. For example, in various example embodiments, the camera module 770 can photograph a depth image and a color image, and can include the depth camera and the color camera.

In various example embodiments, the 1st camera 771 (e.g., depth camera) can photograph a depth image of a subject (e.g., a user), using a light source (e.g., infrared (IR)). The 1st camera 771 can include an IR generator, and an image sensor. The image sensor can convert IR reflected and returned from the subject, into a depth image signal. In accordance with various example embodiments, the IR generator can be configured in plural. In accordance with various example embodiments, the depth image signal can include depth information (e.g., location information and/or distance information) about the subject.

In various example embodiments, in a depth camera scheme that uses an IR pattern scheme (structured light scheme), the IR generator can generate a constant IR pattern. In a depth camera scheme that uses a TOF scheme, the IR generator can generate IR light having a profile of a certain general or special shape.

According to one example embodiment, in a depth camera scheme that uses an IR pattern scheme (structured light scheme), the IR generator can generate IR and form a constant IR pattern, and irradiate the IR into a prism lens described later. In various example embodiments, the constant IR pattern can be generated by the unit of pixel, and the constant IR pattern can be generated in a linear structure or circular structure such as an array, etc. In various example embodiments, the IR generator can be distinguished into a light emitting unit and a light receiving unit. The light emitting unit can perform a role of generating a pattern necessary for acquiring depth information, i.e., IR proximity light information. The light emitting unit can project a pattern having a constant rule, into a subject that is intended to be restored in three dimensions. For example, the light emitting unit can perform a role of scattering an IR proximity light pattern that is designed to have a spatial rule array. The light receiving unit can acquire a color image and depth information (e.g., IR information), using the proximity light pattern scattered through the light emitting unit. According to one example embodiment, the light receiving unit can be a 1st camera or a 2nd camera. The light receiving unit can acquire the depth information and the color image, using one or two cameras. For example, the light receiving unit can be a photo diode. The photo diode can detect light in a scheme of sensing incident light, and converting a quantity of the sensed light into an electric signal, and outputting the electric signal. The light detected in the light receiving unit can include light of a plurality of mutually different types. That is, the light received in the light receiving unit can, for example, include light corresponding to a specific region of the visible spectrum, and light corresponding to the infrared spectrum. Accordingly to this, the light receiving unit can include a photo diode. The photo diode can extract color information about the light (for example, red light, green light, and blue light) corresponding to the specific region of the visible spectrum of the light spectrum.

The image sensor can convert IR into a depth image signal. The IR is light reflected and returned from a subject after being irradiated into the subject through the prism lens in the IR generator. In various example embodiments, the depth image signal converted from the IR can include distance information between each IR point of the IR and a subject such that the depth image signal can be displayed with a different-size point, for example, pixel value in accordance with a distance between the each IR point of the IR and the subject. According to one example embodiment, if the distance with the subject is great according to the distance information with the subject, the each IR point of the IR can be displayed with a relatively small pixel value. In contrast, if the distance is less, the each IR point of the IR can be displayed with a relatively large pixel value. In accordance with various example embodiments, the image sensor can be implemented as a Charged Coupled Device (CCD) or a Complementary Metal-Oxide Semiconductor (CMOS).

In various example embodiments, the 2nd camera 773 (e.g., color camera) can convert external incident light into an image signal and photograph a color image of a subject. The 2nd camera 773 can include an image sensor (e.g., 2nd image sensor) converting light into an image signal. Like the image sensor (e.g., the 1st image sensor) of the 1st camera 771, the image sensor of the 2nd camera 773 can be implemented as a CCD or CMOS.

The sensor module 775 can have the same or similar construction with the sensor module 240 of FIG. 2. In various example embodiments, the sensor module 775 can sense a movement and motion of the electronic device 400, and provide the control unit 780 with sensing information according to the sensing result. In accordance with various example embodiments, the sensor module 770 can irradiate a light source to acquire depth information through the camera module 770, and provide sensing information according to the irradiation result to the control unit 780. The sensor module 775 can, for example, include various sensors such as an infrared sensor (i.e., depth sensor), a gyro sensor, an acceleration sensor, an angular velocity sensor, a GPS sensor, a rotation recognition sensor, etc. In accordance with various example embodiments, at least a part (e.g., infrared sensor) of the sensor module 775 can be configured in plural, and can be implemented to have a constant array. According to one example embodiment, a plurality of infrared sensors can be configured in a specific array to output light sources at mutually different directivity.

The control unit 780 (e.g., processor or control circuit) can control the general operation of the electronic device 400. In various example embodiments, the control unit 780 can, for example, have the same or similar construction with the processor 210 of FIG. 2. In various example embodiments, the control unit 780 can process the operations of detecting an object by using depth sensors, and generating depth information related with the detected object, and distinguishing a plurality of depth sensors into depth sensors of a region used for the object detection and a region not used for the object detection by using the depth information, and setting mutually different power to the distinguished depth sensors to output light sources.

The control unit 780 can include one or more processors for controlling an operation of the electronic device 400. For example, the control unit 780 may include various processing circuitry, such as, for example, and without limitation, a dedicated processor, a CPU, a Communication Processor (CP), an Application Processor (AP), an interface (e.g., General Purpose Input/Output (GPIO), an internal memory, etc. as separate constituent elements. Or, the control unit 780 can integrate the CP, the AP, the interface, the internal memory, etc. into one or more integrated circuits. In accordance with one example embodiment, the application processor can execute several software programs and perform several functions for the electronic device 400. The communication processor can perform processing and control for voice communication and data communication. The control unit 780 can take charge of a role of executing a specific software module (e.g., an instruction set) stored in the memory 750, and performing specific several functions corresponding to the specific software module.

In various example embodiments, the control unit 780 can control an operation of a hardware module such as the audio processing unit 740, the interface unit 760, the display 731, the camera module 770, the sensor module 775, etc. In accordance with various example embodiments, the control unit 780 can be electrically and/or operatively coupled with the wireless communication unit 710 of the electronic device 400, the display 731, the memory 750, and the sensor module 775.

The control (or processing) operation of the control unit 780 according to various example embodiments of the present disclosure is described in detail with reference to the drawings described below.

According to various example embodiments of the present disclosure, the control unit 780 can be implemented as one or more processors executing one or more programs stored in the memory 750, and controlling an operation of the electronic device 400 according to various example embodiments of the present disclosure.

According to various example embodiments of the present disclosure, the control unit 780 can include a light source control module 785 for processing a function of controlling a light source of a depth sensor for the purpose of decreasing power consumption in 3-dimensional image photographing. In accordance with various example embodiments, the light source control module 785 can, for example, include a location check module 785A, a determination module 785B, an execution module 785C, etc.

In accordance with various example embodiments, the location check module 785A can determine a location and/or distance of an object (e.g., a user or subject) through a depth sensor. For example, the location check module 785A can determine which zone (region) the object is located in, based on depth information provided from the depth sensor.

In accordance with various example embodiments, the determination module 785B can determine a light source that will be used, based on the location and/or distance of the object determined in the location check module 785A. For example, the determination module 785B can determine a 1st depth sensor of a zone in which the object is located and a 2nd depth sensor adjacent to the 1st depth sensor, based on the result determined in the location check module 785A. Based on the distance of the object, the determination module 785B can determine power for light source irradiation for the 1st depth sensor, and can determine power for the 2nd depth sensor. The determination module 785B can determine to cut off power supply (e.g., turn-off) for another 3rd depth sensor other than the 2nd depth sensor, not adjacent to the 1st depth sensor.

In accordance with various example embodiments, the execution module 785C can process light source irradiation, based on the result determined in the determination module 785B. For example, the execution module 785C can control the 1st depth sensor, the 2nd depth sensor, and the 3rd depth sensor to output light sources at mutually different power. Also, the execution module 785C can analyze image information data of a camera region unit in the 1st camera and the 2nd camera. The execution module 785C can separate and control each of the image information data (e.g., a digital gain value) of the camera region unit being point-to-point mapped with each depth sensor, as well. The modules included in the control unit 780 according to the present disclosure may include hardware (e.g., circuitry), software (e.g., program module) or a combination thereof.

The power supply 790 can receive a supply of an external power source or an internal power source under the control of the control unit 780, and supply a power source necessary for an operation of each constituent element. In various example embodiments of the present disclosure, the power supply 790 can power On/Off the display 731, the camera module 770, the sensor module 775, etc. under the control of the control unit 780.

As described above, the electronic device 400 according to various example embodiments of the present disclosure can include a plurality of output units comprising output circuitry configured to output an identification signal to an external object, a sensor configured to acquire an identification signal that is a reflection of the identification signal from an external object, and a processor. The processor can be configured to determine the first state of the external object regarding the electronic device, based at least on the reflected identification signal, to designate the plurality of output units as a 1st subset and a 2nd subset, based at least on the first state of the external object, and to mutually differently control the 1st subset and the 2nd subset to output the identification signal.

In accordance with various example embodiments, the identification signal can be set to include a light source (e.g., light) outputted based on an IR sensor or light sensor, or an ultrasonic wave output by an ultrasonic sensor.

In accordance with various example embodiments, the 1st subset can include a 1st depth sensor in which the object has been detected and a 2nd depth sensor adjacent to the 1st depth sensor, and the 2nd subset can include a 3rd depth sensor in which the object is not detected and which is spaced apart from the 1st depth sensor.

In accordance with various example embodiments, the processor can be configured to control the 1st subset at a 1st intensity, and control the 2nd subset at a 2nd intensity.

In accordance with various example embodiments, the processor can be configured to designate at least one output unit corresponding to a location of the external object, as the 1st subset, and designate at least one output unit adjacent to the 1st subset, as the 2nd subset.

In accordance with various example embodiments, the processor can be configured to determine the second state of the external object, using the 1st subset and the 2nd subset.

In accordance with various example embodiments, the electronic device can further include a camera, and the processor can be configured to acquire a depth image of the external object, based at least on the second state, by using the camera.

As described above, the electronic device 400 according to various example embodiments of the present disclosure can include a camera, a plurality of depth sensors operatively coupled with the camera, and a processor operatively coupled with the camera and the depth sensors. The processor can be configured to detect an object external to the electronic device, to generate depth information related with the detected object, using at least some of the plurality of depth sensors, to select at least one of the plurality of depth sensors as a 1st sensor set for detecting the object, based on at least a part of the depth information, select another at least one of the plurality of depth sensors as a 2nd sensor configured to refrain from detecting the object, and to output data of the 1st sensor set and the 2nd sensor set, using mutually different power.

In accordance with various example embodiments, the processor can be configured to perform the object detection, based at least on object relation information that is received based on at least one of the camera, the depth sensor, an external camera, or an external sensor.

In accordance with various example embodiments, the 1st sensor set can be configured to include a 1st depth sensor in which the object has been detected and a 2nd depth sensor adjacent to the 1st depth sensor, and the 2nd sensor set can be configured to include a 3rd depth sensor in which the object is not detected and which is spaced apart from the 1st depth sensor.

In accordance with various example embodiments, the processor can be configured to perform the object detection at the maximum power of the depth sensors, and acquire depth information of the detected object, and mutually differently set power of the 1st sensor set and the 2nd sensor set, based on the depth information, and optimize and process output data of the camera corresponding to the 1st sensor set.

In accordance with various example embodiments, the processor can be configured to determine the 1st depth sensor of a region in which the object has been detected, and set power of the determined 1st depth sensor by 1st power, set power of the 2nd depth sensor by 2nd power different from the 1st power, and set to turn Off power of the 3rd depth sensor.

In accordance with various example embodiments, the processor can be configured to monitor the movement or non-movement of the object or the entry or non-entry of a new object, and if there is an object change based on the monitoring result, detect depth information according to the object change, and reset power of the 1st sensor set and the 2nd sensor set, based on the depth information.

In accordance with various example embodiments, the processor can be configured to include a location check module for determining depth information of the object, using at least some of the plurality of depth sensors, a determination module for determining power that will be used for the plurality of depth sensors, based at least on a part of the depth information of the object determined in the location check module, and an execution module for controlling power of the plurality of depth sensors, based on the determination result of the determination module.

As described above, the electronic device 400 according to various example embodiments of the present disclosure can include a camera (e.g., the 1st camera 771 and/or the 2nd camera 773), a plurality of depth sensors operatively coupled with the camera, and a processor (e.g., the control unit 780) operatively coupled with the camera and the depth sensors. The processor can be configured to detect an object, using the depth sensors, and generate depth information related with the detected object, and distinguish the plurality of depth sensors into depth sensors of a region used for the object detection and a region not used for the object detection, using the depth information, and set mutually different power to the distinguished depth sensors and output light sources.

In accordance with various example embodiments, the processor can be configured to analyze image information data of the camera (e.g., the 1st camera 771 and/or the 2nd camera 773), and associate with each a plurality of depth sensors.

In accordance with various example embodiments, the processor can be configured to turn Off power for light source output for a depth sensor of a region not used for the object detection, and set power to correspond to the depth information, for a depth sensor of a region used for the object detection.

In accordance with various example embodiments, the processor can be configured to perform the object detection at the maximum power of the depth sensors, and acquire depth information of the detected object, and determine a 1st depth sensor of a region where the object has been detected, based on the depth information, and set power of the determined 1st depth sensor, based on the depth information.

In accordance with various example embodiments, the processor can be configured to determine a distance of the object, based on the depth information, and determine power necessary for light source output of the 1st depth sensor, correspondingly to the determined distance, and change and set power of the 1st depth sensor from the maximum power to the determined power according to the distance with the object, based on the determined power.

In accordance with various example embodiments, the processor can be configured to set power of another 2nd depth sensor other than the 1st depth sensor, by power different from the set power of the 1st depth sensor.

In accordance with various example embodiments, the processor can be configured to set power of a depth sensor adjacent to the 1st depth sensor by the minimum power, and set to turn Off a depth sensor not adjacent to the 1st depth sensor.

In accordance with various example embodiments, the processor can be configured to monitor the movement or non-movement of the object or the entry or non-entry of a new object, and if there is an object change based on the monitoring result, detect depth information according to the object change, and reset power of the 1st depth sensor and the 2nd depth sensor, based on the depth information.

In accordance with various example embodiments, the processor can be configured to distinguish a plurality of image recognition regions correspondingly to the plurality of depth sensors, and determine an image recognition region for image analysis among the plurality of image recognition regions, and perform the image analysis for the object through the determined image recognition region.

In accordance with various example embodiments, the processor can be configured to analyze a color distribution change or motion change in a color image of the object, and determine an entry or movement change of the object, based on the analysis result.

In accordance with various example embodiments, the processor can be configured to include the location check module 785A for determining depth information of the object through the depth sensor, the determination module 785B for determining a light source that will be used, based on the depth information of the object determined in the location check module 785A, and the execution module 785C for processing light source output, based on the determination result of the determination module 785B.

In accordance with various example embodiments, the camera can be configured to include the 1st camera 771 (e.g., depth camera) for acquiring depth information of the object, and the 2nd camera 773 (e.g., color camera) for acquiring shape or color information of the object.

Figure 8:
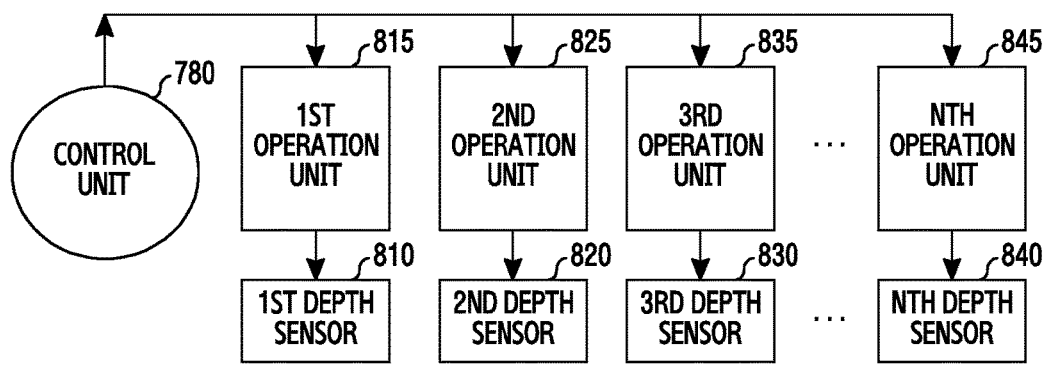
FIG. 8 is a diagram illustrating an example construction for executing adaptive light source irradiation in an electronic device according to various example embodiments of the present disclosure.

FIG. 8 is a diagram illustrating an example construction for executing adaptive light source irradiation in an electronic device according to various example embodiments of the present disclosure.

FIG. 8 illustrates an example of a construction for controlling a light source array (e.g., a plurality of depth sensors) for the sake of adaptive light source irradiation. According to various example embodiments, the electronic device 400 can configure each of driving blocks (e.g., a 1st operation unit 815, a 2nd operation unit 825, a 3rd operation unit 835, and/or an Nth operation unit 845) driving several light source arrays (e.g., a 1st depth sensor 810, a 2nd depth sensor 820, a 3rd depth sensor 830, and/or an Nth depth sensor 840). In various example embodiments, the electronic device 400 can control the driving blocks by the control unit 780 of the electronic device 400, or can configure a separate control circuit controlling the respective driving blocks.

According to various example embodiments, a construction and driving method thereof being based on a system utilizing a depth sensor and adaptively irradiating a light source of the depth sensor are disclosed. As described above, in various example embodiments, the electronic device 400 can implement a plurality of depth sensors for a light source. And, the electronic device 400 can operate in a scheme of detecting a user's location, and powering On only a corresponding depth sensor of a light source corresponding to the user's location, and powering Off a corresponding depth sensor of a light source not corresponding to the user's location. According to one example embodiment, in case where the user's location is detected by the 2nd depth sensor 820, the control unit 780 can control the 2nd operation unit 825 to adjust light source power of the 2nd depth sensor 820. And, the control unit 780 can control operation units (e.g., the 1st operation unit 815, the 3rd operation unit 835, and/or the Nth operation unit 845) of other depth sensors (e.g., the 1st depth sensor 810, the 3rd depth sensor 830, and/or the Nth depth sensor 840) to adjust light source power of the corresponding depth sensors.

According to various example embodiments, the control unit 780 can set a corresponding operation unit (e.g., the 2nd operation unit 825) such that a depth sensor (e.g., the 2nd depth sensor 820) corresponding to a user's location irradiates a light source at power that is optimized corresponding to a user's distance. In various example embodiments, the control unit 780 can analyze image information data of the 1st camera and 2nd camera and individually control the corresponding image information data (e.g., digital gain value) of the 1st camera and 2nd camera associated with a corresponding depth sensor. And, the control unit 780 can integrally analyze and determine and control the image information data as well.

According to various example embodiments, the control unit 780 can set to figure out a user's motion in advance, and support a preliminary operation, i.e., handover between depth sensors in consideration of a movement to a region corresponding to an adjacent depth sensor (e.g., the 1st depth sensor 810 and/or the 3rd depth sensor 830) as well as a corresponding depth sensor (e.g., the 2nd depth sensor 820). In this case, to predict a user's movement, the control unit 780 can utilize, for example, a Dynamic Vision Sensor (DVS). Through this, the control unit 780 can analyze an immediate user's movement behavior pattern.

As above, according to various example embodiments, the electronic device 400 can implement a light source of a depth sensor by several arrays (depth sensors), not one array. And, by detecting a user's location, the electronic device 400 can decrease power consumption by powering Off a light source of a light source array of a region in which a user does not exist, that is, a region not used for the user detection. And, the electronic device 400 can decrease power consumption by optimizing power of a light source of a light source array of a region where the user exists, i.e., a region used for the user detection, to correspond to a user's distance. Also, the electronic device 400 can support a seamless smooth operation, by applying handover to an adjacent light source array in consideration of a user's movement.

Figure 9:
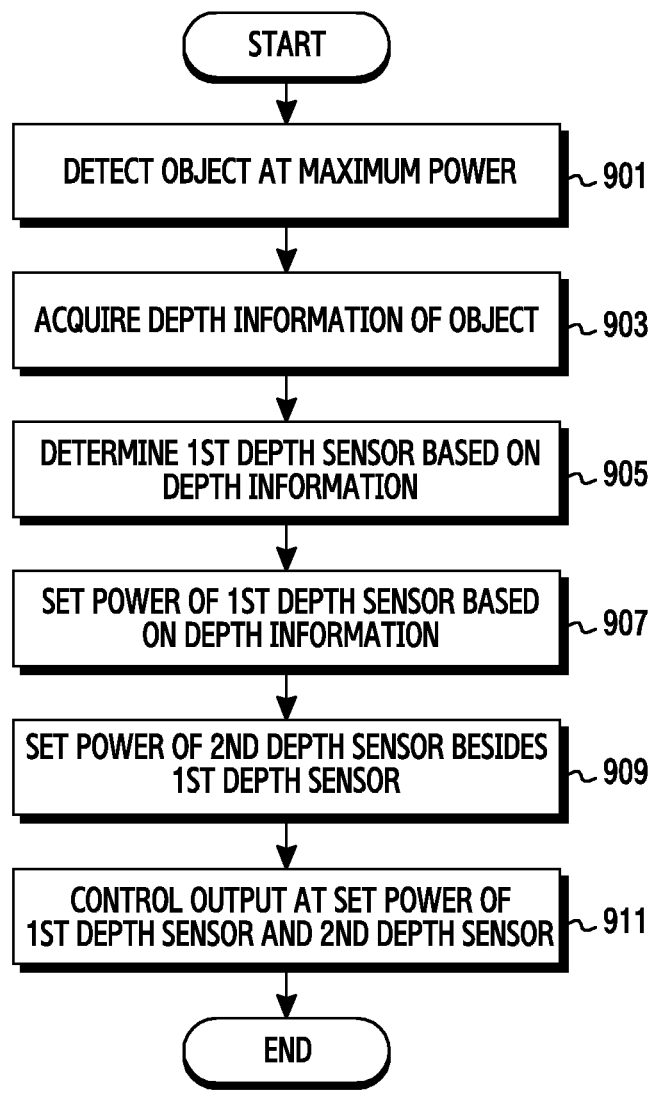
FIG. 9 is a flowchart illustrating an example method of operating an electronic device according to various example embodiments of the present disclosure.

FIG. 9 is a flowchart illustrating an example method of operating an electronic device according to various example embodiments of the present disclosure.

Referring to FIG. 9, in operation 901, the control unit 780 of the electronic device 400 can perform object detection at the maximum power. According to various example embodiments, the control unit 780 can detect an object (e.g., a user and/or a subject) at the maximum power of all depth sensors in the full coverage of the depth sensors. For example, when the control unit 780 initiates an operation for 3-dimensional image photographing (e.g., game execution, etc. by a detected user), the control unit 780 can enable a plurality of depth sensors to irradiate light sources at the maximum power, and perform the object detection in the full coverage of the depth sensors.

In operation 903, the control unit 780 can acquire depth information (e.g., location and/or distance) of the object, based on the object detection. For example, the control unit 780 can determine a location (i.e., region) and distance where the object is detected in the full coverage.

In operation 905, the control unit 780 can determine a 1st depth sensor, based on the depth information. For example, the control unit 780 can determine a depth sensor of the location (i.e., region) where the object is detected among the plurality of depth sensors.

In operation 907, the control unit 780 can set power of the 1st depth sensor that is determined based on the depth information. For example, based on the depth information, the control unit 780 can determine a distance between the electronic device 400 and the object. And, the control unit 780 can determine power required for light source irradiation of the 1st depth sensor correspondingly to the determined distance. The control unit 780 can set to change the power of the 1st depth sensor from the maximum power to the determined power according to the distance with the object, based on the determined power.

In operation 909, the control unit 780 can set power of another 2nd depth sensor other than the 1st depth sensor. For example, the control unit 780 can set (e.g., pulse control, turn-on/turn-off control of a constant minimum period) power of a depth sensor adjacent to the 1st depth sensor, by the minimum power, and can set to turn off a depth sensor not adjacent to the 1st depth sensor. In other words, the control unit 780 can set power of a depth sensor of a region adjacent to the region where the object is detected, by the minimum power, and can set to turn off a depth sensor of another region excluding the region where the object is detected and the adjacent region. In various example embodiments, operation 907 and operation 909 can be carried out in order, in reverse order or in parallel.

In operation 911, the control unit 780 can control an output at the set power of the 1st depth sensor and 2nd depth sensor. According to one example embodiment, the control unit 780 can control a light source output at the set power of the 1st depth sensor and 2nd depth sensor.

Figure 10:
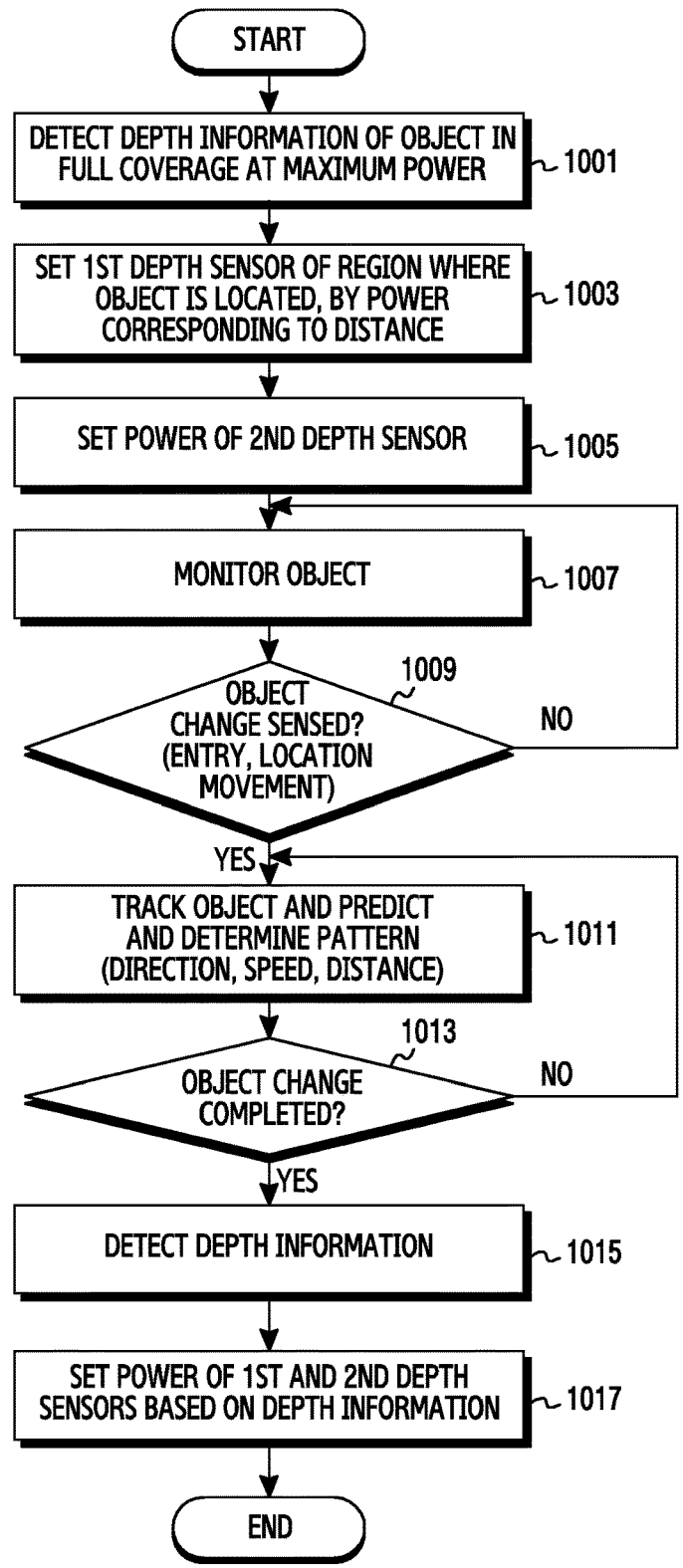
FIG. 10 is a flowchart illustrating an example method of operating an electronic device according to various example embodiments of the present disclosure.

FIG. 10 is a flowchart illustrating an example method of operating an electronic device according to various example embodiments of the present disclosure.

Referring to FIG. 10, in operation 1001, the control unit 780 of the electronic device 400 can detect depth information (e.g., location and/or distance) of an object (e.g., user and/or subject) in full coverage at the maximum power. According to one example embodiment, when the control unit 780 initiates an operation for 3-dimensional image photographing (e.g., game execution, etc. by a detected user), the control unit 780 can enable a plurality of depth sensors to irradiate light sources at the maximum power and track the object in the full coverage, thereby detecting a location and distance of the object.

In operation 1003, the control unit 780 can set a 1st depth sensor of a region where the object is located, by power corresponding to the distance of the object. In various example embodiments, if the control unit 780 determines the 1st depth sensor of the location (region) where the object is detected among the plurality of depth sensors, the control unit 780 can reset power of the 1st depth sensor, by power dependent on the distance with the object.

In operation 1005, the control unit 780 can set power of the 2nd depth sensor. In various example embodiments, the control unit 780 can set power of a depth sensor adjacent to the 1st depth sensor by the minimum power, and can set to turn Off a depth sensor not adjacent to the 1st depth sensor. In other words, the control unit 780 can set power of a depth sensor for a region adjacent to the region where the object is detected, by the minimum power, and can set to turn Off a depth sensor for another region excluding the region where the object is detected and the adjacent region. In various example embodiments, operation 1003 and operation 1005 can carried out in order, in reverse order or in parallel.

In operation 1007, the control unit 780 can monitor the object. For example, the control unit 780 can control to irradiate light sources at the set power through the 1st depth sensor and the 2nd depth sensor, and can monitor the object on the basis of the 1st depth sensor and the 2nd depth sensor. In various example embodiments, the object monitoring can be an operation of monitoring a change or non-change of the object such as whether the object located in a region corresponding to the 1st depth sensor is moved to another region, whether a new object enters, etc. In various example embodiments, the control unit 780 can control to set all depth sensors by the maximum power every constant period and cover the maximum region (e.g., the full coverage) every constant period, thereby detecting the entry or non-entry of the new object. In various example embodiments, the control unit 780 can recognize a motion of the object in advance, and determine the movement or non-movement of the object to a coverage region of an adjacent depth sensor. If the movement of the object to the coverage region of the adjacent depth sensor is determined, the control unit 780 can operate to support handover between depth sensors.

In operation 1009, the control unit 780 can determine a change or non-change of the object, based on the monitoring result. For example, the control unit 780 can determine if a new object enters, if the object moves to another region, etc.

If the object change is not sensed in operation 1009 (in case of 'No' of operation 1009), the control unit 780 can return to operation 1007 and process the execution of operations subsequent to operation 1007.

If the object change is sensed in operation 1009 (in case of 'Yes' of operation 1009), in operation 1011, the control unit 780 can track the object, and predict and determine a pattern of the object. For example, the control unit 780 can analyze at least one piece of changing information among direction, speed or distance information in which the object moves, and can predict a movement pattern of the object in accordance with the analyzed information. In various example embodiments, when the control unit 780 detects the entry of the new object into another region, the control unit 780 can determine this as the object change, and can track the new object and predict and determine a pattern of the new object. According to various example embodiments, predicting and determining the movement pattern of the object can be carried out using a dynamic vision sensor.

In operation 1013, the control unit 780 can determine the completion or non-completion of the object change. For example, in case where a change of a location or distance of the object is not sensed, the control unit 780 can determine that the object change is completed. According to one example embodiment, in case where the object moves from a 1st region of the 1st depth sensor to a 2nd region of the 2nd depth sensor and then is fixed in the 2nd region, the control unit 780 can determine that the object change is completed. According to another example embodiment, in case where the object moves from the 1st region of the 1st depth sensor toward the 1st depth sensor (e.g., distance decrease) or moves in the opposite direction to the 2nd depth sensor (e.g., distance increase) and then is fixed, the control unit 780 can determine that the object change is completed. According to a further example embodiment, in case where a new object enters a region of a specific depth sensor and then is fixed in a corresponding region of the specific depth sensor, the control unit 780 can determine that the object change is completed.

In operation 1013, if it is determined that the object change is not completed (in case of 'No' of operation 1013), for example, if the object keeps moving, or if the object enters another region and keeps moving in the another region, the control unit 780 can return to operation 1011 and process the execution of operations subsequent to operation 1011.

If it is determined that the object change is completed in operation 1013 (in case of 'Yes' of operation 1013), in operation 1015, the control unit 780 can detect depth information according to the object change. For example, the control unit 780 can detect a location and distance of the changed object.

In operation 1017, the control unit 780 can set power of the 1st depth sensor and 2nd depth sensor, based on the depth information. According to one example embodiment, if the control unit 780 determines a change that the object moves forward in the region of the 1st depth sensor, the control unit 780 can control power of the 1st depth sensor in accordance with the changed distance of the object. For example, the control unit 780 can increase or decrease the power of the 1st depth sensor in accordance with a distance change. According to another example embodiment, if the object moves from the region of the 1st depth sensor to a region of another depth sensor (e.g., a 3rd depth sensor), the control unit 780 can set the 1st depth sensor by the minimum power or set to turn off the 1st depth sensor, and can set power of the 3rd depth sensor by power corresponding to the distance of the object. According to a further example embodiment, if a new object enters, the control unit 780 can set power of a corresponding depth sensor (e.g., a 4th depth sensor) correspondingly to depth information of the new object, and can set power of a depth sensor adjacent to the 4th depth sensor.

Figure 11:
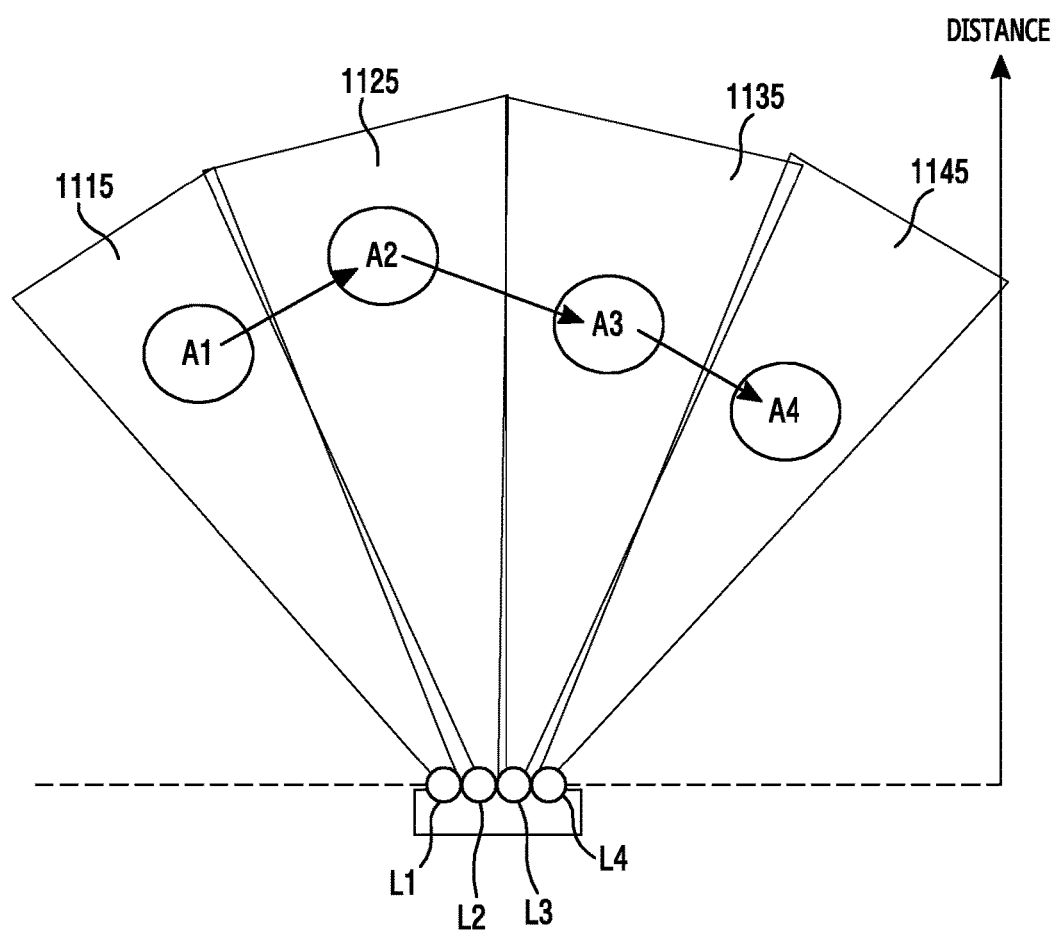
FIG. 11 is a diagram illustrating an example of adaptive power control of a depth sensor in an electronic device according to various example embodiments of the present disclosure.

FIG. 11 is a diagram illustrating an example of adaptive power control of a depth sensor in an electronic device according to various example embodiments of the present disclosure.

FIG. 11 illustrates an example of a method of tracking a movement of an object, and controlling power of a depth sensor adaptively in accordance with the movement of the object. According to various example embodiments, the electronic device 400 can dynamically track a location of the object, and dynamically control a light source output of the depth sensor in accordance with a change of the location of the object. For example, the electronic device 400 utilizes a light source of a depth sensor of a region where the object exists, and does not utilize a light source of a depth sensor of a region where the object does not exist. And, the electronic device 400 can also control power of the depth sensor of the region where the object exists adaptively in accordance with a distance side of the object, and output a light source of the depth sensor of the region where the object exists.

In accordance with various example embodiments, the example of FIG. 11 describes a case in which four depth sensors are configured. However, the present disclosure is not limited to this and, as mentioned earlier, two or more depth sensors can be configured in various arrays.

In accordance with one example embodiment, referring to FIG. 11 and an example of Table 1 below, in case where an object exists in a 1st region 1115 of a 1st depth sensor (L1), only the 1st depth sensor (L1) can turn On and operate at power dependent on a distance (e.g., a location A1) of the object, and other depth sensors (e.g., a 2nd depth sensor (L2), a 3rd depth sensor (L3), and a 4th depth sensor (L4)) can turn Off. Likewise this, in case where the object exists in a 2nd region 1125 of the 2nd depth sensor (L2), a 3rd region 1135 of the 3rd depth sensor (L3), or a 4th region 1145 of the 4th depth sensor (L4), only the corresponding depth sensor can turn On and operate at power dependent on a distance (e.g., a location A2, a location A3, or a location A4) of the object, and the other depth sensors excluding the working depth sensor can turn Off.

TABLE 1

|    | A1  | A2  | A3  | A4  |
|----|-----|-----|-----|-----|
| L1 | ON  | OFF | OFF | OFF |
| L2 | OFF | ON  | OFF | OFF |
| L3 | OFF | OFF | ON  | OFF |
| L4 | OFF | OFF | OFF | ON  |

In accordance with various example embodiments, the electronic device 400 can monitor a movement of an object, and can control handover between depth sensors and adaptive power, correspondingly to the movement of the object.

In accordance with one example embodiment, FIG. 11 assumes that the electronic device 400 photographs at about 30 fps (frame per second) through a depth camera (e.g., the 1st camera 771). And, FIG. 11 assumes that the object exists in a location A1 (e.g., a distance corresponding to about 60% of the maximum distance) in the 1st region 1115 of the 1st depth sensor (L1), and the object exists in a location A2 (e.g., a distance corresponding to about 80% of the maximum distance) in the 2nd region 1125 of the 2nd depth sensor (L2), and the object exists in a location A3 (e.g., a distance corresponding to about 50% of the maximum distance) in the 3rd region 1135 of the 3rd depth sensor (L3), and the object exists in a location A4 (e.g., a distance corresponding to about 40% of the maximum distance) in the 4th region 1145 of the 4th depth sensor (L4).

In accordance with various example embodiments, when assuming a distance between the object of the location A1 and the 1st depth sensor (L1) is a 1st distance, and a distance between the object of the location A2 and the 2nd depth sensor (L2) is a 2nd distance, and a distance between the object of the location A3 and the 3rd depth sensor (L3) is a 3rd distance, and a distance between the object of the location A4 and the 4th depth sensor (L4) is a 4th distance, the relationship of 2nd distance>1st distance>3rd distance>4th distance is assumed. Also, in the above assumption, it is assumed to add a weight of about 10% to a distance with the object in accordance with the distance with the object, and set power. For example, in case where the object exists in the location A1, the 1st depth sensor (L1) can add the weight of about 10%, to work at power of about 70% (e.g., about 60% of the maximum distance plus the weight of about 10%) at about 30 fps.

On the above assumption, as illustrated in FIG. 11, when the object exists in the location A1 of the 1st region 1115, the 2nd depth sensor (L2) adjacent to the 1st depth sensor (L1) can monitor a movement or non-movement of the object at the maximum power at a constant period. For example, the 2nd depth sensor (L2) can be set to work at power of about 100% (e.g., the maximum power) at a frame less than the set frame, for example, about 3 frames per second (i.e., about 10% of the set frame about 30 fps).

In the above state, if the object moves from the location A1 of the 1st region 1115 to the location A2 of the 2nd region 1125 of the 2nd depth sensor (L2), the 1st depth sensor (L1) of the 1st region 1115 where the object is located can be set to work at power of about 100% at about 3 fps, and the 2nd depth sensor (L2) can be set to work at power of about 90% (i.e., about 80% of the maximum distance plus the weight about 10%) at about 30 fps. At this time, the 1st depth sensor (L1) and 3rd depth sensor (L3) adjacent to the 2nd depth sensor (L2) can be set to work at power of about 100% at about 3 fps.

In the above state, if the object moves from the location A2 of the 2nd region 1125 to the location A3 of the 3rd region 1135, the 1st depth sensor (L1) powers Off, and the 3rd depth sensor (L3) of the 3rd region 1135 where the object is located can be set to work at power of about 60% (i.e., about 50% of the maximum distance plus the weight about 10%) at about 30 fps. The 2nd depth sensor (L2) and 4th depth sensor (L4) adjacent to the 3rd depth sensor (L3) can be set to work at power of about 100% at about 3 fps.

In the above state, if the object moves from the location A3 of the 3rd region 1135 to the location A4 of the 4th region 1145, the 2nd depth sensor (L2) powers Off, and the 4th depth sensor (L4) of the 4th region 1145 where the object is located can be set to work at power of about 50% (i.e., 40% of the maximum distance plus the weight about 10%) at about 30 fps. The 3rd depth sensor (L3) adjacent to the 4th depth sensor (L4) can be set to work at power of about 100% at about 3 fps.

In accordance with one example embodiment, as in the example of FIG. 11, a depth sensor adjacent to a depth sensor of a region where an object is located can repeat turn-On/turn-Off every constant period and at turn-On, can output a light source at the maximum power. In accordance with another example embodiment, the depth sensor adjacent to the depth sensor of the region where the object is located can be implemented to work at the minimum power for detecting a movement change of the object as well.

Figure 12:
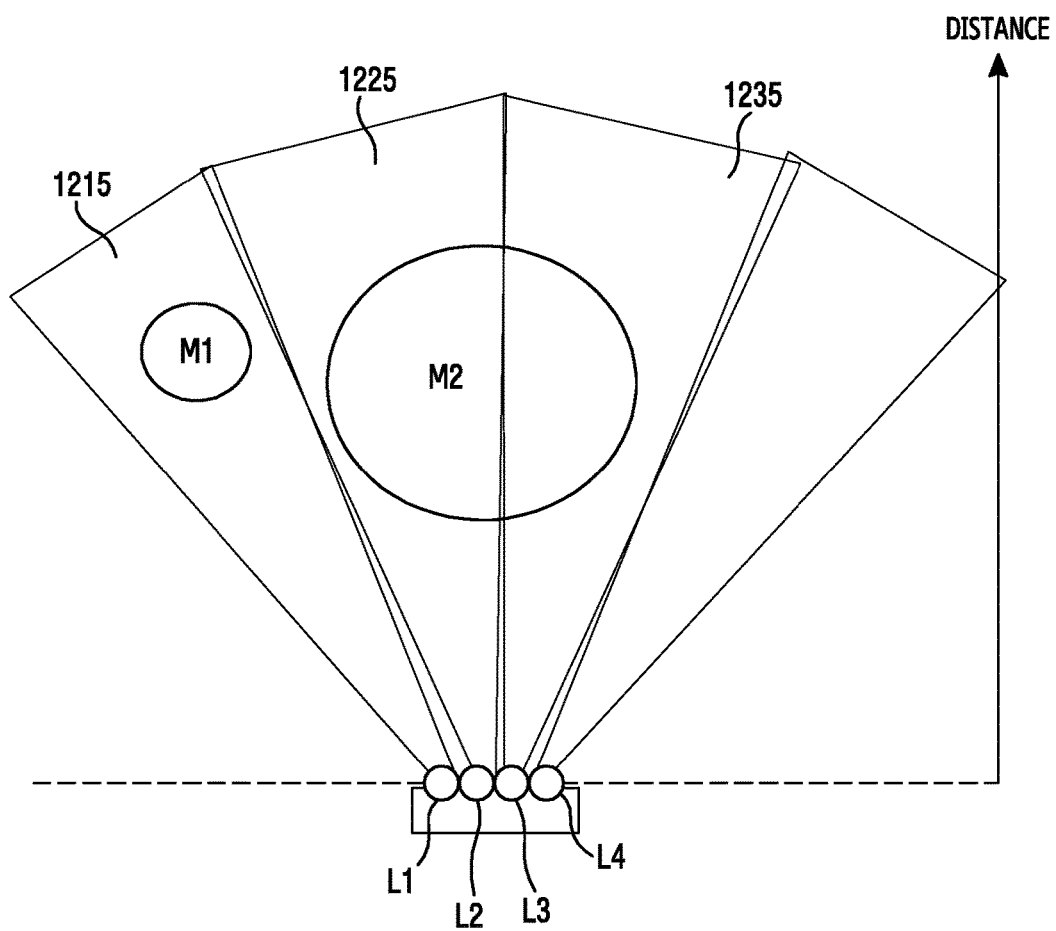
FIG. 12 is a diagram illustrating an example of adaptive power control of a depth sensor in an electronic device according to various example embodiments of the present disclosure.

FIG. 12 is a diagram illustrating an example of adaptive power control of a depth sensor in an electronic device according to various example embodiments of the present disclosure.

FIG. 12 illustrates an example of a method of adaptively controlling power of a depth sensor in accordance with object movement in a state where a 1st object exists and a new 1st object enters or in a state where the 1st object and a 2nd object exist together. According to various example embodiments, the electronic device 400 can dynamically track locations of two objects (e.g., the 1st object (M1) and 2nd object (M2)), and dynamically control light source output of the depth sensor in accordance with the priority order of the respective objects and a location change thereof.

According to one example embodiment, as illustrated in FIG. 12, when assuming that a main monitoring (or analysis) object is the 2nd object (M2), in case where the 2nd object (M2) exists overlapping with a 2nd region 1225 of a 2nd depth sensor (L2) and a 3rd region 1235 of a 3rd depth sensor (L3), the electronic device 400 can concurrently use the 2nd depth senor (L2) and the 3rd depth sensor (L3). Also, in case where the 1st object (M1) exists together other than the 2nd object (M2), the electronic device 400 can use the 1st depth sensor (L1) of the 1st region 1215 where the 1st object (M1) exists, together with the 2nd depth senor (L2) and the 3rd depth sensor (L3). Here, when assuming that the main object is the 2nd object (M2) and the 1st object (M1) is not used, the 1st depth sensor (L1) can be set to work at approximately 3 fps for use in an adjacent region for movement of the 2nd object (M2).

FIG. 13, FIG. 14, FIG. 15, FIG. 16 and FIG. 17 are diagrams illustrating examples of adaptive power control of a depth sensor in an electronic device according to various example embodiments of the present disclosure.

In accordance with various example embodiments, as illustrated in FIG. 13, FIG. 14, FIG. 15, FIG. 16 and FIG. 17, the electronic device 400 can work using the 1st camera 771 (e.g., depth camera), the 2nd camera 773 (e.g., color camera), and a plurality of depth sensors 1310, 1320, 1330, and 1340 (e.g., infrared sensors).

According to various example embodiments, the electronic device 400 can acquire depth information of an object 1300, based on the 1st camera 771 and the depth sensors 1310, 1320, 1330, and 1340. And, the electronic device 400 can acquire a color image of the object 1300, based on the 2nd camera 773. According to one example embodiment, the electronic device 400 can include the plurality of depth sensors 1310, 1320, 1330, and 1340 as light emitting units for irradiating light for recognizing the object 1300. And, the electronic device 400 can include the 1st camera 771 and the 2nd camera 773 as light receiving units for acquiring depth information and a color image by using at least one of a plurality of light irradiated through the light emitting units. In accordance with various example embodiments, at least one of the 1st camera 771 or the 2nd camera 773 can further include an image processing unit (not shown) for image processing of the color image. The image processing unit or a function thereof can be executed by the control unit 780 of the electronic device 400. In accordance with various example embodiments, the depth sensors 1310, 1320, 1330, and 1340 working as the light emitting units can be arranged in different locations and irradiate a plurality of light sources into respective set beamforming regions.

In accordance with various example embodiments, object detection can be conducted using a camera (e.g., the 1st camera 771 (e.g., depth camera) and/or the 2nd camera 773 (e.g., color camera)) or a depth sensor, for example. In accordance with various example embodiments, the object detection can be carried out by various external devices (e.g., an external camera, an external sensor, etc.) that are operatively coupled with the electronic device 400. Also, the object detection can be conducted in such a manner that the external device provides information related with the object detection to the electronic device 400, as well. Various example embodiments are possible.

In accordance with various example embodiments, the 1st camera 771 and the 2nd camera 773 can be configured independently and acquire an image of the object 1300 for 3-dimensional motion recognition. In accordance with various example embodiments, the 1st camera 771 and the 2nd camera 773 can be arranged in locations spaced a constant distance apart. And, the 1st camera 771 and the 2nd camera 773 can be arranged up/down with a criterion of a Y-axis or can be arranged left/right with a criterion of an X-axis on the same plane. According to another example embodiment, the 1st camera 771 and the 2nd camera 773 can be arranged, for example, front/rear with a criterion of a Z-axis such that the 1st camera 771 and the 2nd camera 773 do not exist on the same axis. Or, according to various example embodiments, the electronic device 400 can consist of even one camera of the form (e.g., a sequential arrangement of R, G, B, and IR pixels) of including a pixel structure including all of functions of the 1st camera and the 2nd camera.

In accordance with various example embodiments, the electronic device 400 can acquire an image of the same object, using the 1st camera 771 and the 2nd camera 773. According to various example embodiments, in case where the 1st camera 771 and the 2nd camera 773 are arranged to be spaced a constant distance apart, the 1st camera 771 and the 2nd camera 773 can acquire information about the same object with mutually different focuses. Accordingly, in various example embodiments, the electronic device 400 can perform a process (e.g., an image processing process) of acquiring information in which the object is accurately matched in location. Also, according to various example embodiments, the electronic device 400 can configure the 1st camera 771 acquiring depth information of the object and the 2nd camera 773 acquiring shape or color information of the object, in a coaxial manner (i.e., sharing the same axis), using a prism, a plate, etc.

In FIG. 13, FIG. 14, FIG. 15, FIG. 16, and FIG. 17, as mentioned referring to the above drawings, the depth sensors 1310, 1320, 1330, and 1340 can form respective beamforming regions at the maximum power. For example, the 1st depth sensor 1310 can set a direction for covering the 1st region 1315 and form a beamforming region, and irradiate a 1st light source. The 2nd depth sensor 1320 can set a direction for covering the 2nd region 1325 and form a beamforming region, and irradiate a 2nd light source. The 3rd depth sensor 1330 can set a direction for covering the 3rd region 1335 and form a beamforming region, and irradiate a 3rd light source. The 4th depth sensor 1340 can set a direction for covering the 4th region 1345 and form a beamforming region, and irradiate a 4th light source.

Figure 13:
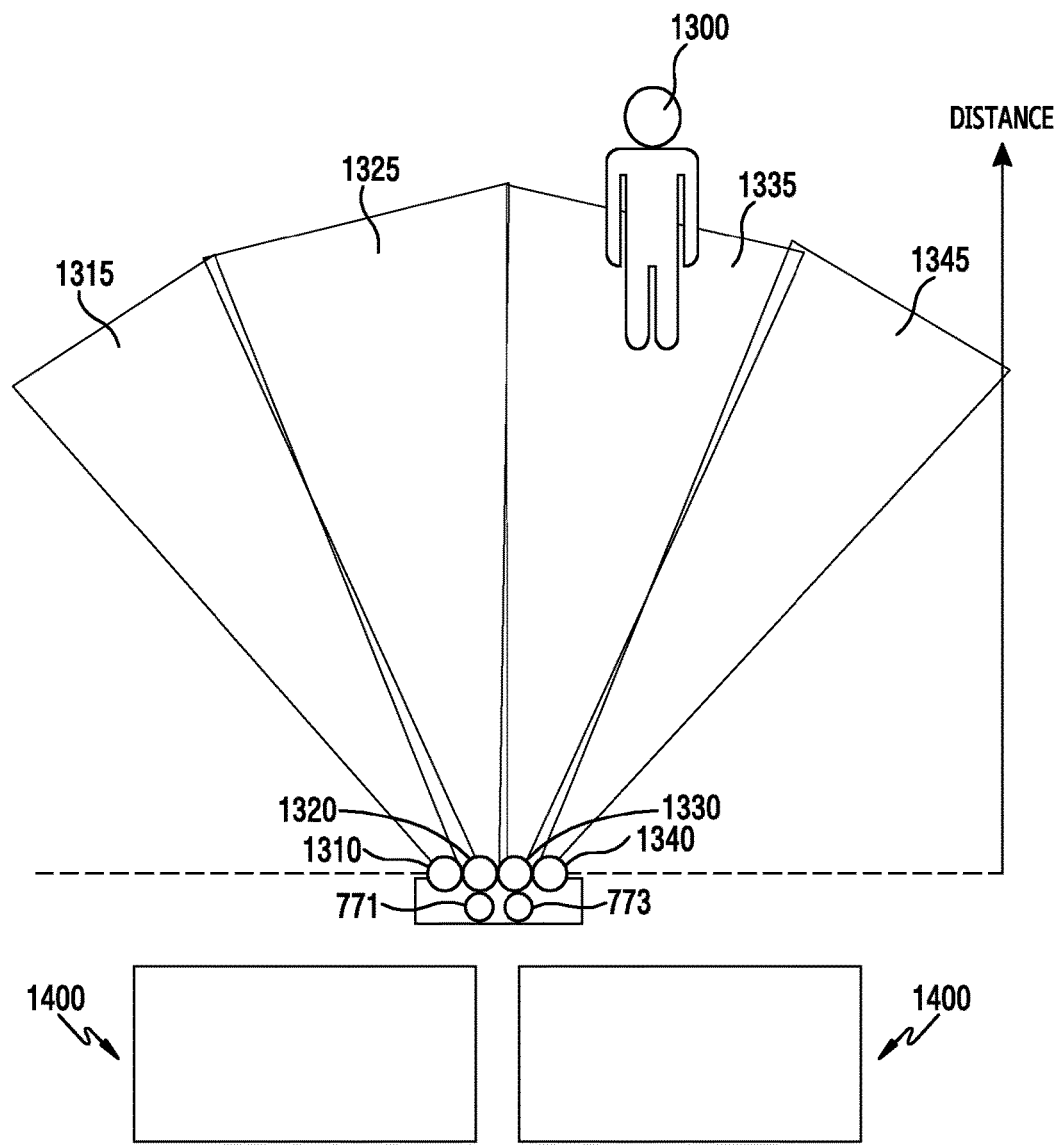
FIG. 13, FIG. 14, FIG. 15, FIG. 16 and FIG. 17 are diagrams illustrating examples of adaptive power control of a depth sensor in an electronic device according to various example embodiments of the present disclosure.

Referring to FIG. 13, in accordance with various example embodiments, the electronic device 400 can acquire an image of the object 1300, based on at least one of the 1st camera 771 or the second camera 773. In accordance with various example embodiments, the electronic device 400 can be configured such that the photographing coverage (e.g., viewing angle) of the 1st camera 771 and 2nd camera 773 covers a range of a left edge part of the 1st region 1315 to a right edge part of the 4th region 1345, for example, the whole range of the 1st region 1315 to the 4th region 1345 (e.g., the whole photographing region 1400).

In various example embodiments, for description convenience sake, the electronic device 400 distinguishes and illustrates the whole photographing region 1400 corresponding to the 1st camera 771 and the whole photographing region 1400 corresponding to the 2nd camera 773, but these are divided for description convenience sake. That is, the whole photographing region 1400 can include the same region as the whole photographing regions 1400 of the 1st camera 771 and the 2nd camera 773. According to one example embodiment, the electronic device 400 can display through the display 731 an image (e.g., including the object 1300 and a background image) acquired from the whole photographing region 1400.

Figure 14:
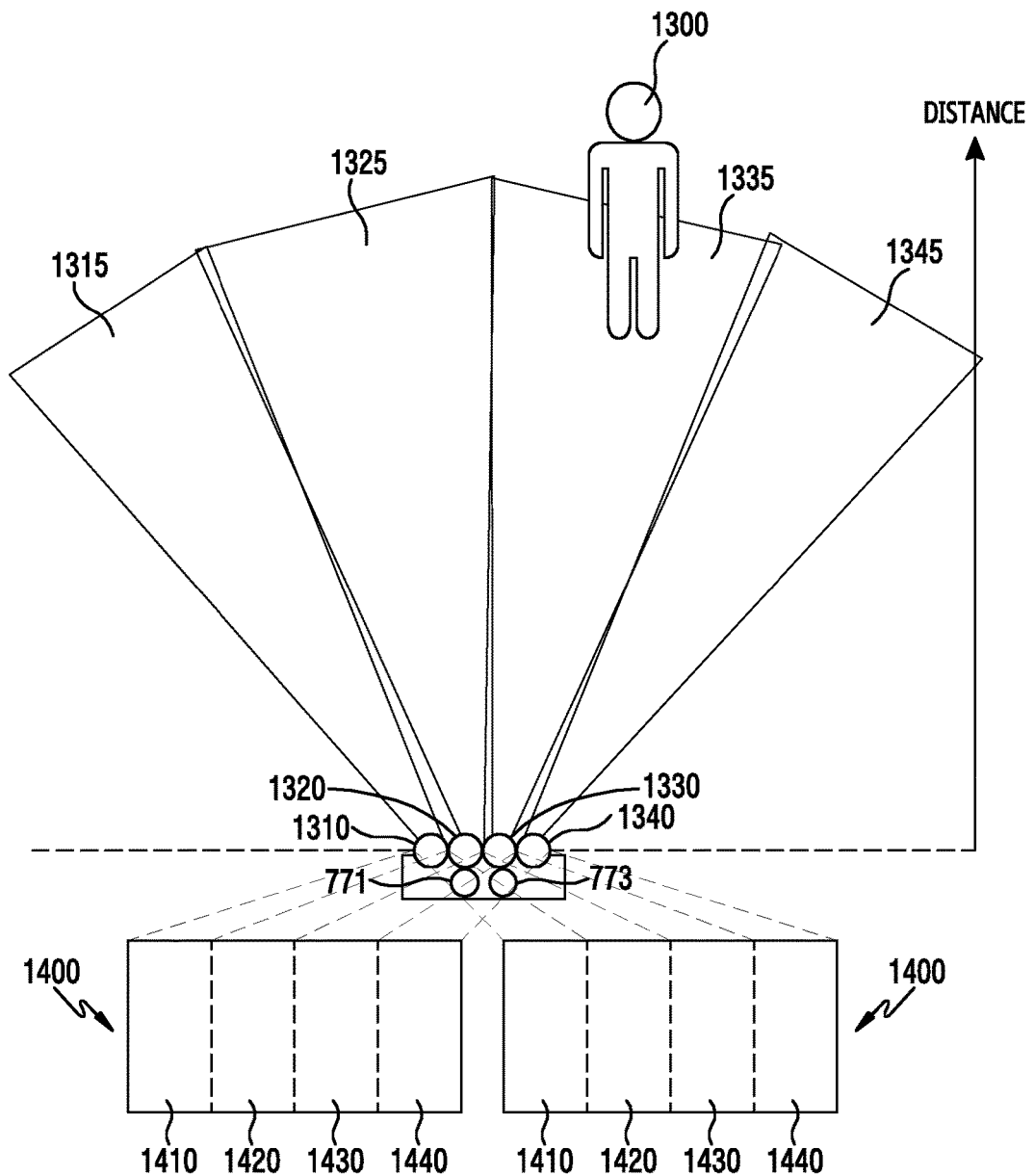

Referring to FIG. 14, in accordance with various example embodiments, the electronic device 400 can virtually divide the whole photographing region 1400 into a plurality of image recognition regions in accordance with the 1st region 1315, the 2nd region 1325, the 3rd region 1335, and the 4th region 1345 divided by the depth sensors 1310, 1320, 1330, and 1340, in an operation for 3-dimensional image recognition. According to one example embodiment, the electronic device 400 can virtually divide the whole photographing region 1400 into a 1st image recognition region 1410, a 2nd image recognition region 1420, a 3rd image recognition region 1430, and a 4th image recognition region 1440. According to one example embodiment, in case where four depth sensors are configured, the electronic device 400 can divide the whole photographing region 1400 into four, to configure four image recognition regions. In case where eight depth sensors are configured, the electronic device 400 can divide the whole photographing region 1400 into eight, to configure eight image recognition regions. Various implementation schemes can be used.

According to various example embodiments, the electronic device 400 can divide an image recognition region and process an image through only a corresponding image recognition region. By doing so, the electronic device 400 can decrease a region (e.g., a Region Of Interest (ROI)) that should be actually analyzed in the control unit 780 and decrease a processing time (or latency) compared to processing an image throughout the whole photographing region 1400, and can improve a substantial image processing speed. According to one example embodiment, the control unit 780 can set an image recognition region of a region where an object is detected (e.g., a region where a depth sensor turns On) among the whole photographing region 1400, as an analysis region of the 1st camera 771, and perform image processing related with depth information. According to one example embodiment, the control unit 780 can set an image recognition region excluding the image recognition region of the 1st camera 771 among the whole photographing region 1400, as an analysis region of the 2nd camera 773, and perform image processing related with color image acquisition (e.g., monitoring object movement, object entry, etc.) As above, in various example embodiments, by minimizing the analysis region, the electronic device 400 can decrease the power consumption of the whole system and improve the performance thereof.

Figure 15:
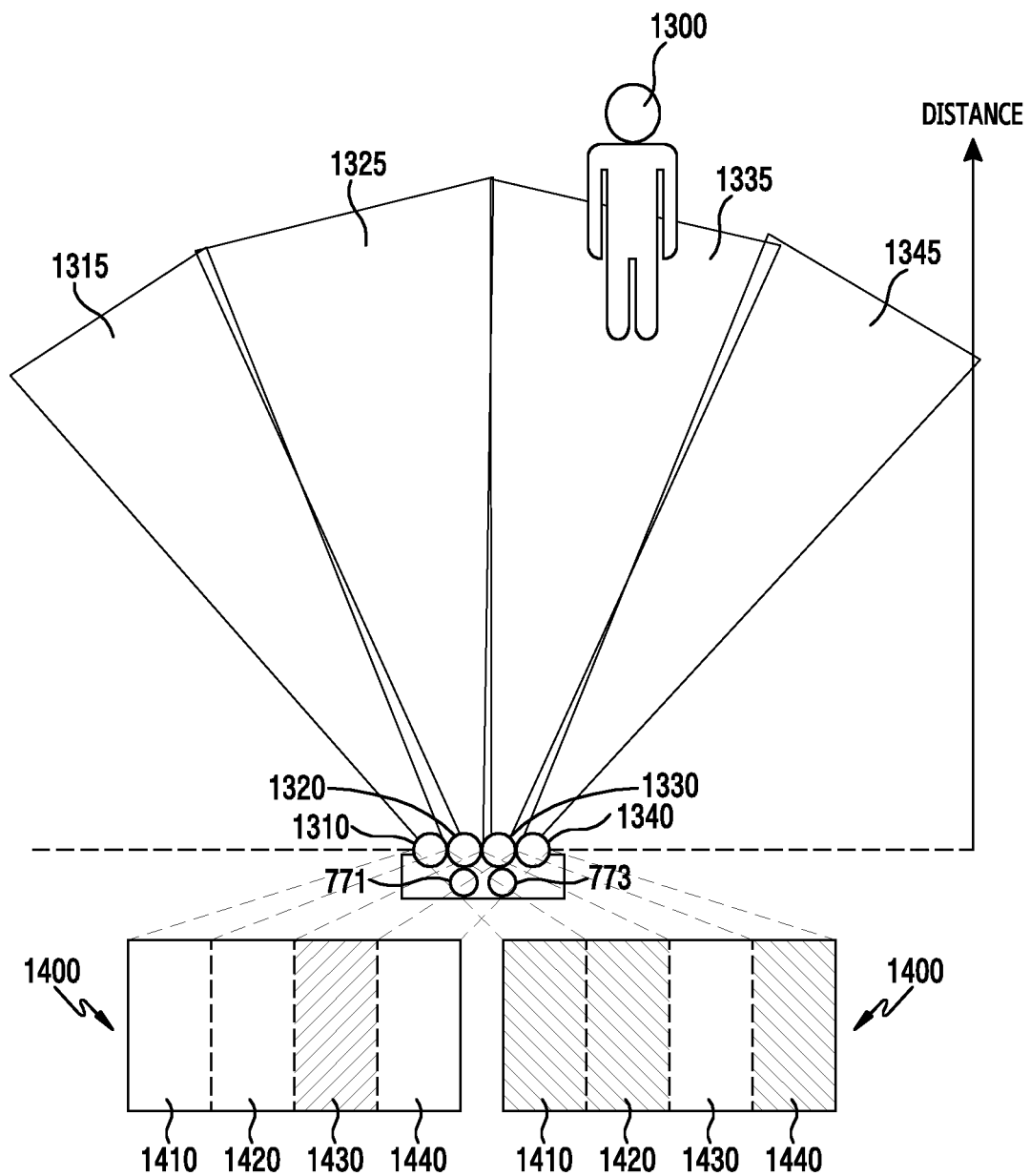

For example, referring to FIG. 15, in accordance with various example embodiments, the electronic device 400 can perform image recognition or processing for the divided image recognition regions, instead of performing image recognition or processing for the whole photographing region 1400. As illustrated in FIG. 15, the electronic device 400 can perform image recognition or processing for the 3rd image recognition region 1430 corresponding to the 3rd region 1335 where the object 1300 is located, i.e., for an analysis region of the 1st camera 771. And, the electronic device 400 can perform image recognition or processing for the 1st image recognition region 1410, 2nd image recognition region 1420, and 4th image recognition region 1440 excluding the 3rd image recognition region 1430, i.e., for analysis regions of the 2nd camera 773. According to one example embodiment, the 3rd image recognition region 1430 where the object 1300 is acquired (or exists) can be a use (available) region used for image processing (or analysis) related with depth information acquired through the 1st camera 771. And, the 1st image recognition region 1410, 2nd image recognition region 1420, and 4th image recognition region 1440 excluding the 3rd image recognition region 1430 can be non-use (or non-available) regions not used for the image processing (or analysis) related with the depth information. Also, according to one example embodiment, the 1st image recognition region 1410, 2nd image recognition region 1420, and 4th image recognition region 1440 excluding the 3rd image recognition region 1430 where the object 1300 is acquired can be a region used for image processing (or analysis) (e.g., object movement or object entry monitoring) related with a color image acquired through the 2nd camera 773.

According to various example embodiments, as the electronic device 400 performs the image processing for the 3rd image recognition region 1430 corresponding to the 3rd region 1335 where the object 1300 is located, not the whole photographing region 1400, the electronic device 400 can increase an image processing speed for depth information analysis. According to various example embodiments, as the electronic device 400 performs the image processing for the 1st image recognition region 1410, 2nd image recognition region 1420, and/or 4th image recognition region 1440 each corresponding to the 1st region 1315, 2nd region 1325, and/or 4th region 1345 where the object 1300 is not located, not the whole photographing region 1400, the electronic device 400 can increase an image processing speed for monitoring of the movement of the object and/or the entry or non-entry of a new object.

According to one example embodiment, the electronic device 400 can be set to acquire depth information of the object 1300, based on the 1st camera 771 and the depth sensors 1310, 1320, 1330, and 1340, and perform power control dependent on the depth information, and track a change of the object 1300 in the image recognition region corresponding to a location of the object 1300, in the color image acquired through the 2nd camera 773. According to one example embodiment, the electronic device 400 can perform an operation of analyzing a color distribution change or motion change of a color image for a region where the object 1300 is not located, and detecting object movement or a new object, based on the analysis result.

According to various example embodiments, the electronic device 400 can check another image recognition region adjacent to an image recognition region corresponding to a location of the object 1300, and can determine the entry or movement of the object every constant period. According to one example embodiment, if an adjacent depth sensor adjacent to a depth sensor of a region where the object 1300 is located is set by the maximum power to cover the maximum region every constant period, the electronic device 400 can perform, even for an image recognition region, an operation of extending to an adjacent image recognition region and detecting an object.

Figure 16:
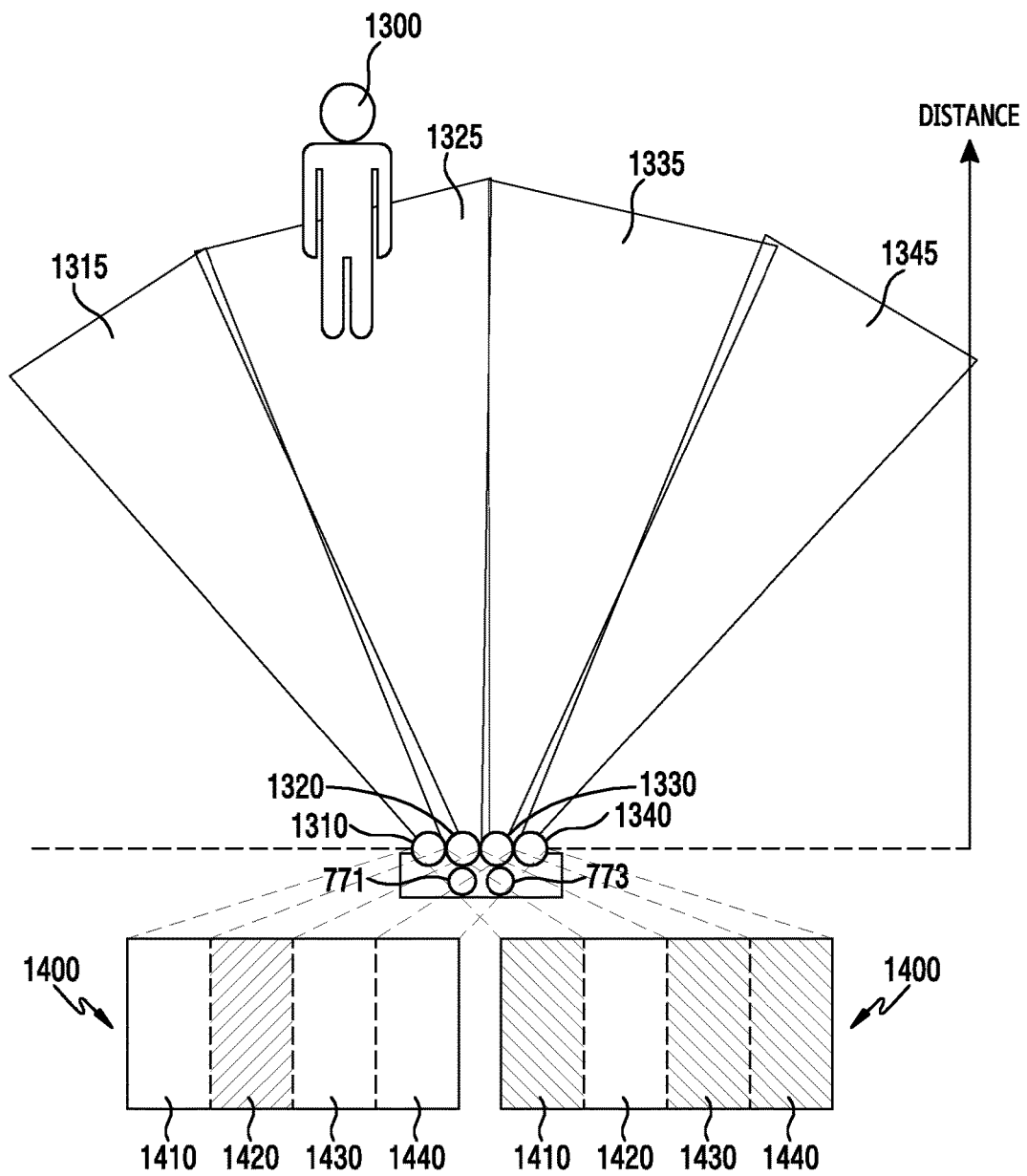

Referring to FIG. 16, in accordance with various example embodiments, the electronic device 400 can determine a movement of the object 1300 (or predict and determine a movement pattern of the object 1300). According to one example embodiment, the electronic device 400 can detect a movement of the object 1300 to another region (e.g., the 2nd region 1325) from a previously located region (e.g., the 3rd region 1335). The electronic device 400 can change an image recognition region for image recognition (or processing) correspondingly to the movement of the object 1300. For example, as illustrated in FIG. 16, if the object 1300 is moved to the 2nd region 1325, the electronic device 400 can change a 2nd image recognition region 1420 corresponding to the 2nd region 1325 (or the 2nd depth sensor 1320) among the whole photographing region 1400, as a use region for image recognition (or processing). According to one example embodiment, a 3rd image recognition region 1430 set according to the 3rd region 1335 where the object 1300 has been formerly located can be changed and set as a non-use region. Also, according to one example embodiment, a 1st image recognition region 1410, the 3rd image recognition region 1430, and a 4th image recognition region 1440 excluding the 2nd image recognition region 1420 where the object 1300 is acquired among the whole photographing region 1400 can be changed as use regions for image recognition (or processing) related with a color image.

Figure 17:
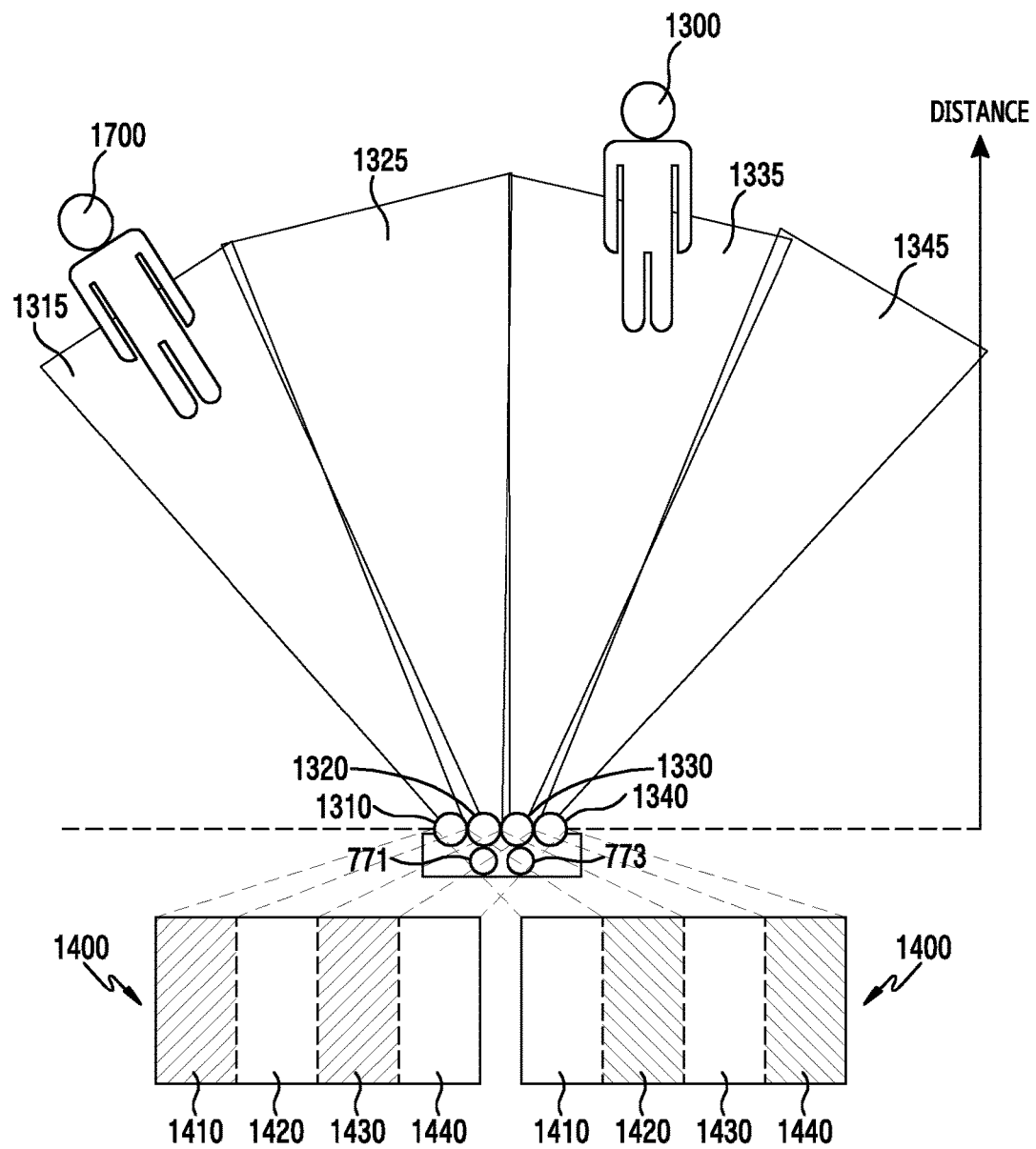

Referring to FIG. 17, in accordance with various example embodiments, the electronic device 400 can determine the entry of a new object 1700. According to one example embodiment, in a state where the object 1300 exists, the electronic device 400 can detect that the new object 1700 enters another region. The electronic device 400 can change (e.g., extend or reduce) an image recognition region for image recognition (or processing), correspondingly to the entry of the new object 1700. For example, as illustrated in FIG. 17, in a state where the object 1300 exists in the 3rd region 1335, in case where the new object 1700 enters the 1st region 1315, the electronic device 400 can extend and set the 3rd image recognition region 1430 corresponding to the 3rd region 1335 (or the 3rd depth sensor 1330) and the 1st image recognition region 1410 corresponding to the 1st region 1315 (or the 1st depth sensor 1310) among the whole photographing region 1400, as use regions for image recognition (or processing). In accordance with various example embodiments, the 2nd image recognition region 1420 and the 4th image recognition region 1440 can be set as non-use regions. For example, the 2nd image recognition region 1420 and the 4th image recognition region 1440 can convert and work as use regions/non-use regions every constant period as well. Also, according to one example embodiment, the electronic device 400 can reduce and set the 2nd image recognition region 1420 and 4th image recognition region 1440 excluding the 1st image recognition region 1410 and 3rd image recognition region 1430 where the object 1700 and the object 1300 are acquired among the whole photographing region 1400, as the use regions for image recognition (or processing).

According to various example embodiments, the electronic device 400 can control power of each depth sensor in accordance with each distance of an object (e.g., at least one of the object 1300 or the object 1700). And, the electronic device 400 can independently determine (or analyze) and control image information data (e.g., a digital gain value) of a portion corresponding to a corresponding region in a camera (e.g., the 1st camera 771).

According to one example embodiment, in case where distances of the object 1300 and the object 1700 are the same (similar) as each other, the control unit 780 can identically set power of each corresponding depth sensor (e.g., the 1st depth sensor 1310 and/or the 3rd depth sensor 1330). Correspondingly to this, the control unit 780 can identically set a gain value to a corresponding region (e.g., the 1st image recognition region 1410 and/or the 3rd image recognition region 1430) in the 1st camera 771 as well. According to another example embodiment, in case where the distances of the object 1300 and the object 1700 are different from each other, the control unit 780 can mutually differently set power of each corresponding depth sensor (e.g., the 1st depth sensor 1310 and/or the 3rd depth sensor 1330). Correspondingly to this, the control unit 780 can mutually differently set a gain value to a corresponding region (e.g., the 1st image recognition region 1410 and/or the 3rd image recognition region 1430) in the 1st camera 771 as well.

Figure 18:
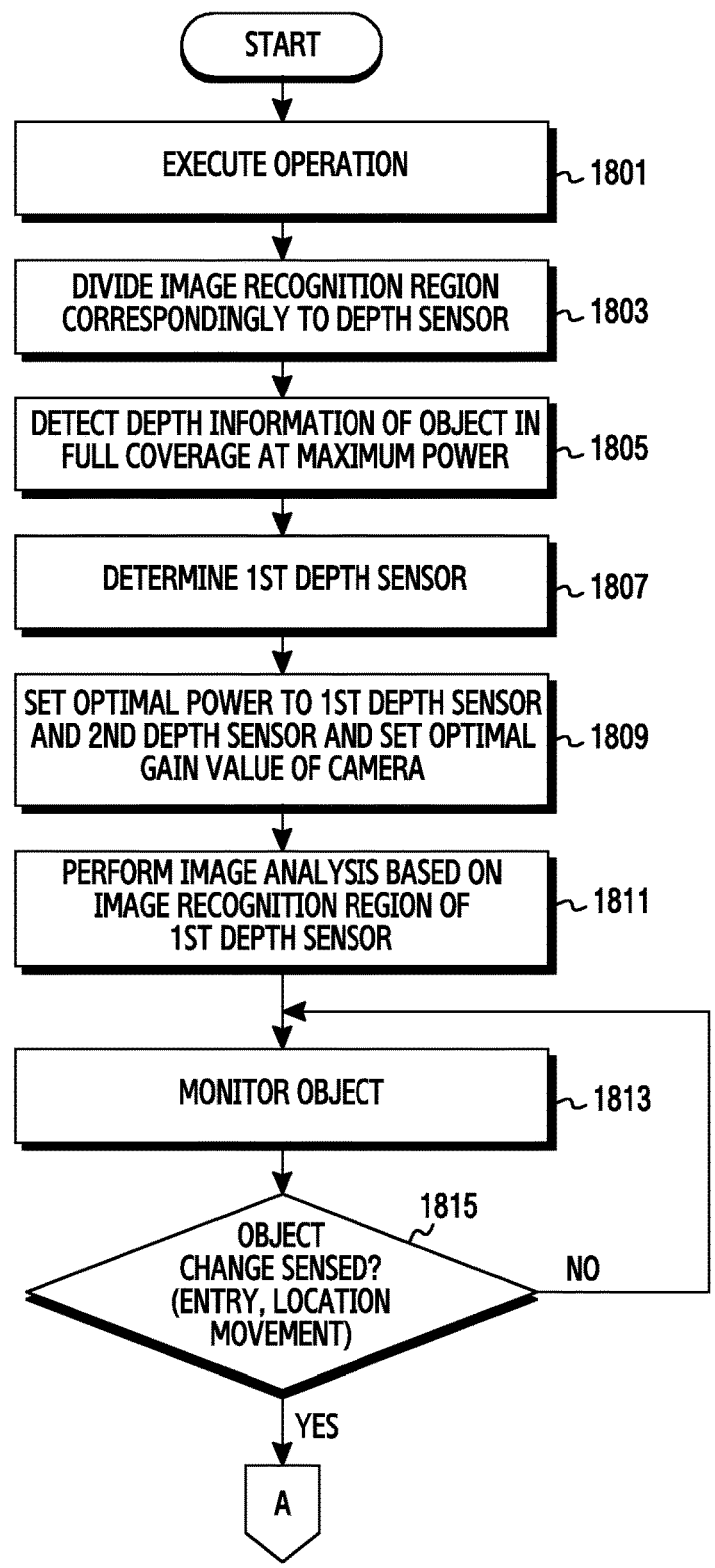
FIG. 18 and FIG. 19 are a flowchart illustrating an example method of operating an electronic device according to various example embodiments of the present disclosure
Figure 19:
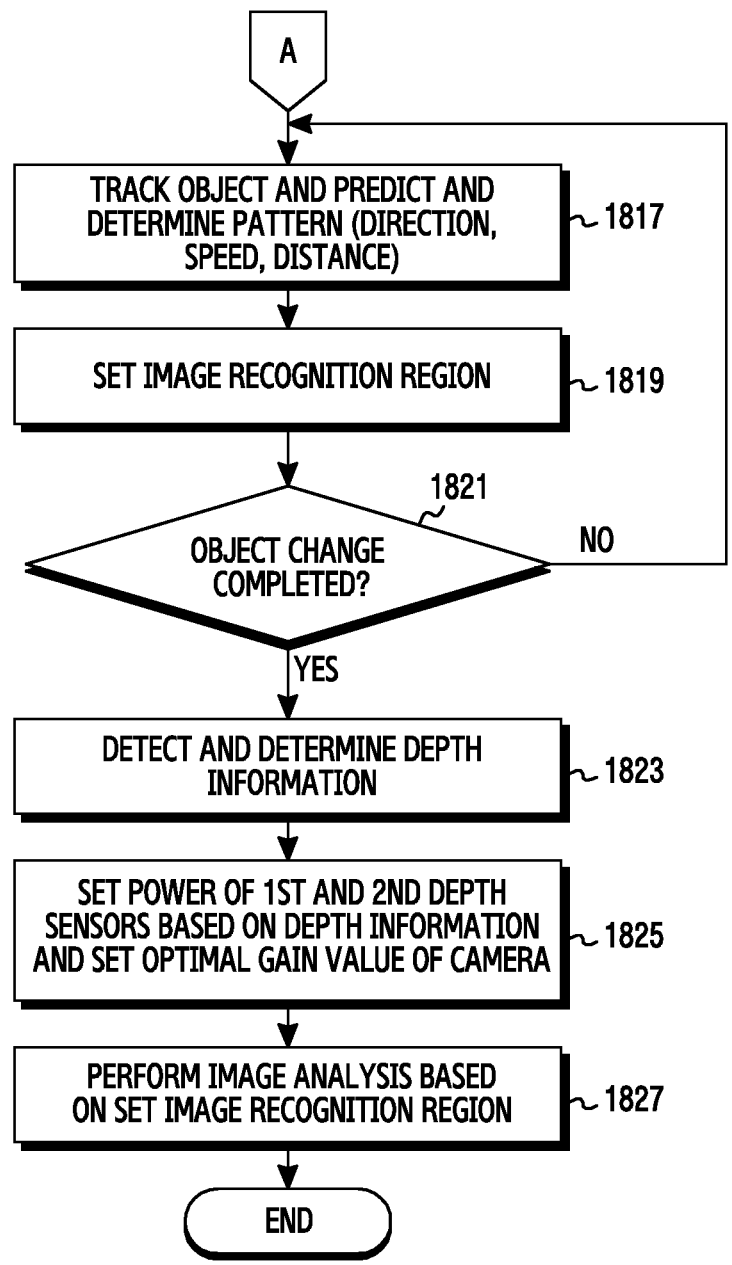

FIG. 18 and FIG. 19 are a flowchart illustrating an example method of operating an electronic device according to various example embodiments of the present disclosure.

Referring to FIG. 18 and FIG. 19, if the control unit 780 of the electronic device 400 senses operation execution in operation 1801, in operation 1803, the control unit 780 can divide an image recognition region correspondingly to a depth sensor. According to various example embodiments, the control unit 780 can divide as many whole photographing regions of the 1st camera 771 and/or the 2nd camera 773 as the number of depth sensors or respective regions that the depth sensors cover. For example, the control unit 780 can configure as many virtual image recognition regions as the number of depth sensors or respective regions that the depth sensors cover. In accordance with various example embodiments, when the control unit 780 initiates (e.g., game execution, etc. by a detected user) an operation for 3-dimensional image photographing, the control unit 780 can configure virtual image recognition regions for image analysis (e.g., image recognition and/or processing) acquired.

In operation 1805, the control unit 780 can detect depth information of an object in full coverage at the maximum power. According to various example embodiments, if the control unit 780 senses an input of initiating the operation execution, in response to the sensed input, the control unit 780 can control to turn On the 1st camera 771 and the 2nd camera 773, and can control a plurality of depth sensors to irradiate light sources at the maximum power. According to various example embodiments, the control unit 780 can operate to detect the object in the full coverage of the depth sensors by controlling all of the depth sensors to irradiate the light sources at the maximum power. In accordance with various example embodiments, operation 1803 and operation 1805 are not necessarily limited to the above operations, and operation 1803 and operation 1805 can be carried out in order, in reverse order or in parallel.

In operation 1807, the control unit 780 can determine a 1st depth sensor. According to various example embodiments, the control unit 780 can acquire the depth information (e.g., location and/or distance) of the object, based on object detection in at least a partial region in the full coverage. For example, if the object is detected in at least one region of the whole region according to the full coverage, the control unit 780 can determine a location (i.e., region) and distance where the object is detected. The control unit 780 can determine the 1st depth sensor, based on the depth information. For example, the control unit 780 can determine the depth sensor of the location (i.e., region) where the object is detected among the plurality of depth sensors.

In operation 1809, the control unit 780 can set optimal power to the 1st depth sensor and another 2nd depth sensor other than the 1st depth sensor. In accordance with various example embodiments, the control unit 780 can determine a distance between the electronic device 400 and the object, based on the depth information. And, the control unit 780 can determine power necessary for light source irradiation of the 1st depth sensor and 2nd depth sensor corresponding to the determined distance. According to one example embodiment, based on the determined power, the control unit 780 can set power of the 1st depth sensor and 2nd depth sensor from the maximum power to another power in accordance with the depth information (e.g., location and/or distance) related with the object. According to one example embodiment, the control unit 780 can set the 1st depth sensor by power corresponding to the depth information (e.g., distance). And, the control unit 780 can set (e.g., pulse control and/or control of turn-on/turn-off in a constant minimum period) power of a depth sensor adjacent to the 1st depth sensor (e.g., a depth sensor for a region adjacent to a region where the object is detected) by the minimum power. And, the control unit 780 can set to turn Off a depth sensor not adjacent to the 1st depth sensor (e.g., a depth sensor for another region excluding the region where the object is detected and the adjacent region). According to one example embodiment, when the control unit 780 sets optimal power corresponding to a depth sensor, the control unit 780 can set image information data (e.g., digital gain value) of a camera corresponding to the corresponding depth sensor. For example, the control unit 780 can set an optimal gain value of a 1st camera corresponding to the 1st depth sensor.

In operation 1811, the control unit 780 can perform image analysis (e.g., image recognition and/or processing), based on an image recognition region corresponding to the 1st depth sensor. For example, the control unit 780 can perform image processing related with the object, based on not the whole photographing region but a part (e.g., image recognition region) of the whole photographing region.

In operation 1813, the control unit 780 can monitor the object. In operation 1815, the control unit 780 can determine if there is a change of the object. In accordance with various example embodiments, the change of the object refers to, for example, a change such as whether a new object is added in full coverage, whether an exiting object is moved to adjacent another region, etc. For example, the control unit 780 can sense the change of the object, based on the depth sensors. Or, the control unit 780 can sense the change of the object, based on recognition of a color image acquired by the 2nd camera 773. According to one example embodiment, the control unit 780 can irradiate light sources at the set power through the 1st depth sensor and the 2nd depth sensor, and can monitor the object on the basis of the 1st depth sensor and the 2nd depth sensor. According to another example embodiment, the control unit 780 can acquire and analyze a color image through the 2nd camera 773, and can monitor the object on the basis of the analyzed color image.

In various example embodiments, the object monitoring can be an operation of monitoring object change or non-change such as whether an object of a specific region is moved to another region, whether a new object enters, etc. In various example embodiments, the control unit 780 can detect the entry or non-entry of the new object, by setting all the depth sensors by the maximum power every constant period or extending the divided image recognition region every constant period to cover the maximum region (e.g., full coverage) every constant period.

In various example embodiments, by recognizing a movement of the object in advance, the control unit 780 can predict and determine the movement of the object to a coverage region (or adjacent image recognition region) of an adjacent depth sensor. The control unit 780 can determine the object change or non-change, based on the monitoring result. For example, the control unit 780 can determine if the new object enters, if the object moves to another region, etc.

If the object change is not sensed in operation 1815 (in case of 'No' of operation 1815), the control unit 780 can return to operation 1813 and process the execution of operations subsequent to operation 1813.

If the object change is sensed in operation 1815 (in case of 'Yes' of operation 1815), in operation 1817, the control unit 780 can track the object and predict and determine a pattern of the object. For example, the control unit 780 can analyze at least one piece of changing information among direction, speed or distance information in which the object moves. And, the control unit 780 can predict a movement pattern of the object in accordance with the analyzed information.

In various example embodiments, when detecting the entry of a new object in another region, the control unit 780 can determine this as the object change. And, the control unit 780 can track the new object and predict and determine a pattern of the new object. According to one example embodiment, by analyzing a color distribution change or motion change in a color image, the control unit 780 can determine the entry or movement change of the object, based on the analysis result.

In operation 1819, the control unit 780 can set an image recognition region, based on the determination result. For example, correspondingly to the movement of the object or the entry of the new object, the control unit 780 can set at least one image recognition region corresponding to a region where the object is moved or a region where the new object enters, among the whole photographing region. According to one example embodiment, in case where the object is moved, the control unit 780 can set a previous image recognition region as a non-use region. And, the control unit 780 can set an image recognition region corresponding to the region where the object is moved, as a use region. According to another example embodiment, in case where the new object enters, the control unit 780 maintains an image recognition region of the existing object as a use region while the control unit 780 can additionally set an image recognition region corresponding to the region where the new object enters, as a use region.

In operation 1821, the control unit 780 can keep monitoring the object, and determine the completion or non-completion of the object change. For example, in case where a location or distance change of the object is not sensed, the control unit 780 can determine that the object change is completed.

If it is determined that the object change is not completed in operation 1821 (in case of 'No' of operation 1821), for example, in case where the existing object keeps moving or in case where the new object enters and keeps moving, the control unit 780 can proceed to operation 1817 and process the execution of operations subsequent to operation 1817.

If it is determined that the object change is completed in operation 1821 (in case of 'Yes' of operation 1821), in operation 1823, the control unit 780 can detect and determine depth information according to the object change. For example, the control unit 780 can detect the changed location and distance of the object.

In operation 1825, the control unit 780 can set power of the 1st depth sensor and 2nd depth sensor, based on the depth information. According to various example embodiments, the control unit 780 can synthetically determine and control and optimize data (e.g., camera digital gain) of a corresponding region corresponding to a camera (e.g., the 1st camera or the 2nd camera) in the camera as well.

According to one example embodiment, in case where the control unit 780 determines an object change that the object moves forward in the region of the 1st depth sensor, the control unit 780 can control power of the 1st depth sensor in accordance with a changed distance of the object. For example, the control unit 780 can increase or decrease the power of the 1st depth sensor in accordance with a distance change.

According to another example embodiment, in case where the object moves from the region of the 1st depth sensor to a region of another depth sensor (e.g., 3rd depth sensor), the control unit 780 can set the 1st depth sensor by the minimum power or turn Off the 1st depth sensor. And, the control unit 780 can set power of the 3rd depth sensor by power corresponding to a distance of the object.

According to a further example embodiment, in case where a new object enters, the control unit 780 can set power of a corresponding depth sensor (e.g., 4th depth sensor) correspondingly to depth information of the new object. And, the control unit 780 can set power of a depth sensor adjacent to the 4th depth sensor. According to one example embodiment, when the control unit 780 sets optimal power corresponding to a depth sensor, the control unit 780 can set image information data (e.g., digital gain value) of a camera corresponding to the corresponding depth sensor. For example, the control unit 780 can set an optimal gain value of the 1st camera corresponding to the 1st depth sensor.

In operation 1827, the control unit 780 can perform image analysis (e.g., image recognition and/or image processing), based on the set image recognition region.

As described above, a method for operating in the electronic device 400 according to various example embodiments of the present disclosure can include the operations of outputting an identification signal to the external object, based on at least one of a plurality of output units, and acquiring an identification signal that is a reflection of the identification signal from an external object, through a sensor, and determining the first state of the external object regarding the electronic device, based at least on the reflected identification signal, and designating the plurality of output units as a 1st subset and a 2nd subset, based at least on the first state of the external object, and mutually differently control the 1st subset and the 2nd subset to output the identification signal.

In accordance with various example embodiments, the operation of outputting can include the operations of controlling the 1st subset at a 1st intensity, and controlling the 2nd subset at a 2nd intensity.

In accordance with various example embodiments, the operation of designating can include the processes of designating at least one output unit corresponding to a location of the external object, as the 1st subset, and designating at least one output unit adjacent to the 1st subset, as the 2nd subset.

In accordance with various example embodiments, the method can include the operation of determining the second state of the external object, using the 1st subset and the 2nd subset.

In accordance with various example embodiments, the method can include the operation of acquiring a depth image of the external object, based at least on the second state, using a camera of the electronic device.

As described above, a method for operating in the electronic device 400 according to various example embodiments of the present disclosure can include the processes of detecting an object, using depth sensors, and generating depth information related with the detected object, and distinguishing a plurality of depth sensors into depth sensors of a region used for the object detection and a region not used for the object detection, using the depth information, and setting mutually different power to the distinguished depth sensors, and optimizing and processing output data of a camera of a region corresponding thereto, and performing light source output, based on the set power.

In accordance with various example embodiments, the process of setting the power can include the processes of turning Off power for light source output for a depth sensor of a region not used for the object detection, and setting power to correspond to the depth information, for a depth sensor of a region used for the object detection.

In accordance with various example embodiments, the process of setting the power to correspond to the depth information can include the processes of performing the object detection at the maximum power of the depth sensors, and acquiring depth information of the detected object, and determining a 1st depth sensor of a region where the object has been detected, based on the depth information, and setting power of the determined 1st depth sensor, based on the depth information, and optimizing and processing output data (e.g., a gain) of a 1st camera corresponding to the 1st depth sensor.

In accordance with various example embodiments, the process of setting the power of the 1st depth sensor can include the processes of determining a distance of the object, based on the depth information, and determining power necessary for light source output of the 1st depth sensor, correspondingly to the determined distance, and changing and setting power of the 1st depth sensor from the maximum power to the determined power according to the distance with the object, based on the determined power, and changing and setting output data (e.g., a gain) of a 1st camera corresponding to the 1st depth sensor, to the maximum.

In accordance with various example embodiments, the process of setting the power can include the processes of setting power of another 2nd depth sensor other than the 1st depth sensor, by power different from the set power of the 1st depth sensor.

In accordance with various example embodiments, the process of setting by the different power can include the processes of setting power of a depth sensor adjacent to the 1st depth sensor by the minimum power, and setting to turn Off a depth sensor not adjacent to the 1st depth sensor.

In accordance with various example embodiments, the method for operating in the electronic device 400 can include the processes of monitoring the movement or non-movement of the object or the entry or non-entry of a new object, and if there is an object change based on the monitoring result, detecting depth information according to the object change, and resetting power of the 1st depth sensor and the 2nd depth sensor, based on the depth information, and optimizing and processing each of output data of a 1st camera corresponding to the 1st depth sensor and 2nd depth sensor.

In accordance with various example embodiments, the method for operating in the electronic device 400 can include the processes of distinguishing a plurality of image recognition regions correspondingly to the plurality of depth sensors, and determining an image recognition region for image analysis among the plurality of image recognition regions, and performing the image analysis for the object through the determined image recognition region.

In accordance with various example embodiments, the method for operating in the electronic device 400 can include the processes of analyzing a color distribution change or motion change in a color image of the object, and determining an entry or movement change of the object, based on the analysis result.

FIG. 20, FIG. 21, FIG. 22 and FIG. 23 are diagrams illustrating examples of configuring a system for image photographing in an electronic device according to various example embodiments of the present disclosure.

FIG. 20, FIG. 21, FIG. 22, and FIG. 23 can illustrate examples of configuring light source coverage (e.g., beam-forming) of each depth sensor in an electronic device that consists of four depth sensors.

Figure 20:
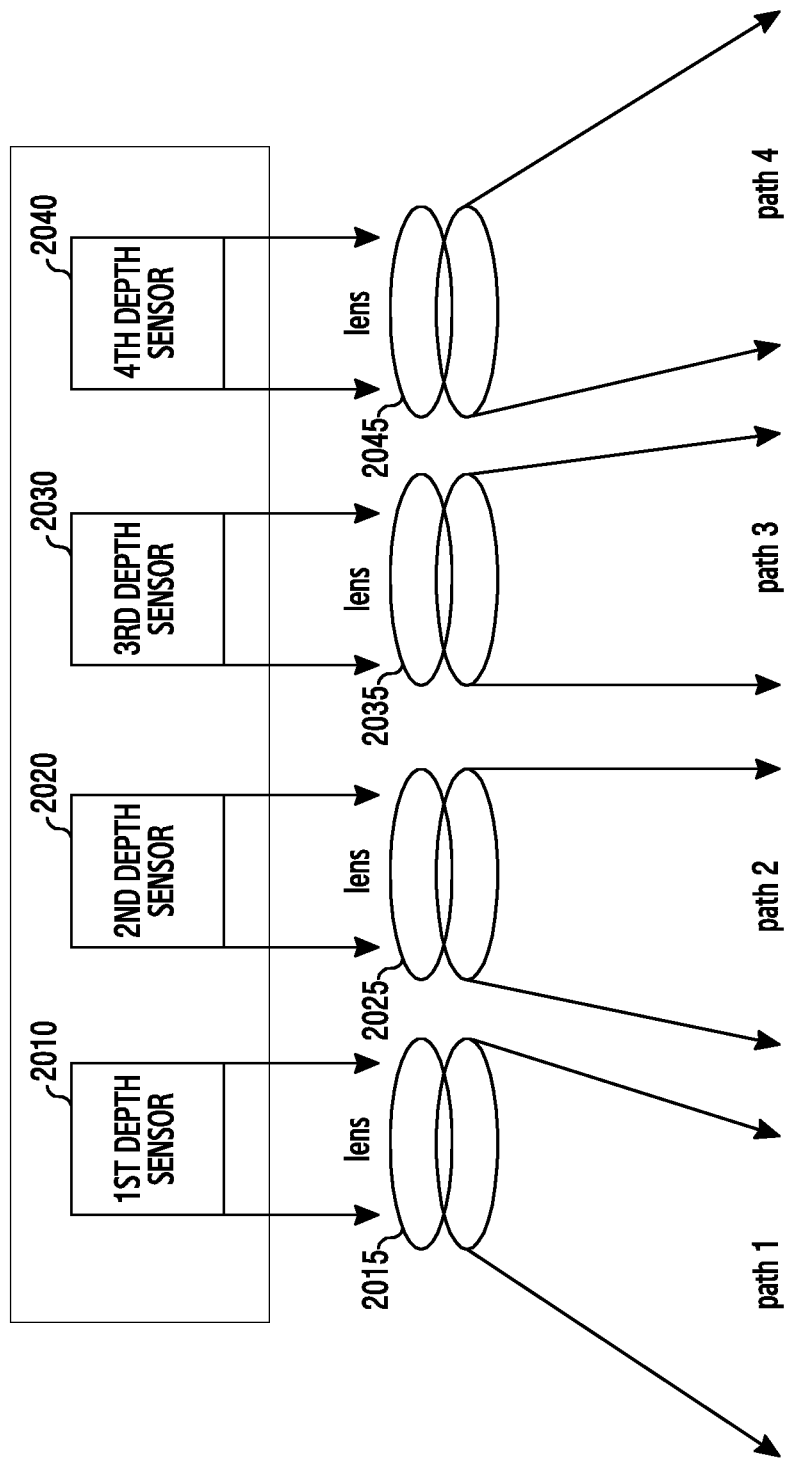
FIG. 20, FIG. 21, FIG. 22 and FIG. 23 are diagrams illustrating examples of configuring a system for image photographing in an electronic device according to various example embodiments of the present disclosure.

As illustrated in FIG. 20, the electronic device can be configured to sequentially arrange four depth sensors (e.g., a 1st depth sensor 2010, a 2nd depth sensor 2020, a 3rd depth sensor 2030, and a 4th depth sensor 2040) on each Printed Circuit Board (PCB). And, the electronic device can be configured to divide the coverage of each of regions (e.g., regions corresponding to a path 1, a path 2, a path 3 and a path 4) by a lens 2015, 2025, 2035, or 2045 in front of each of the depth sensors 2010, 2020, 2030, and 2040.

Figure 21:
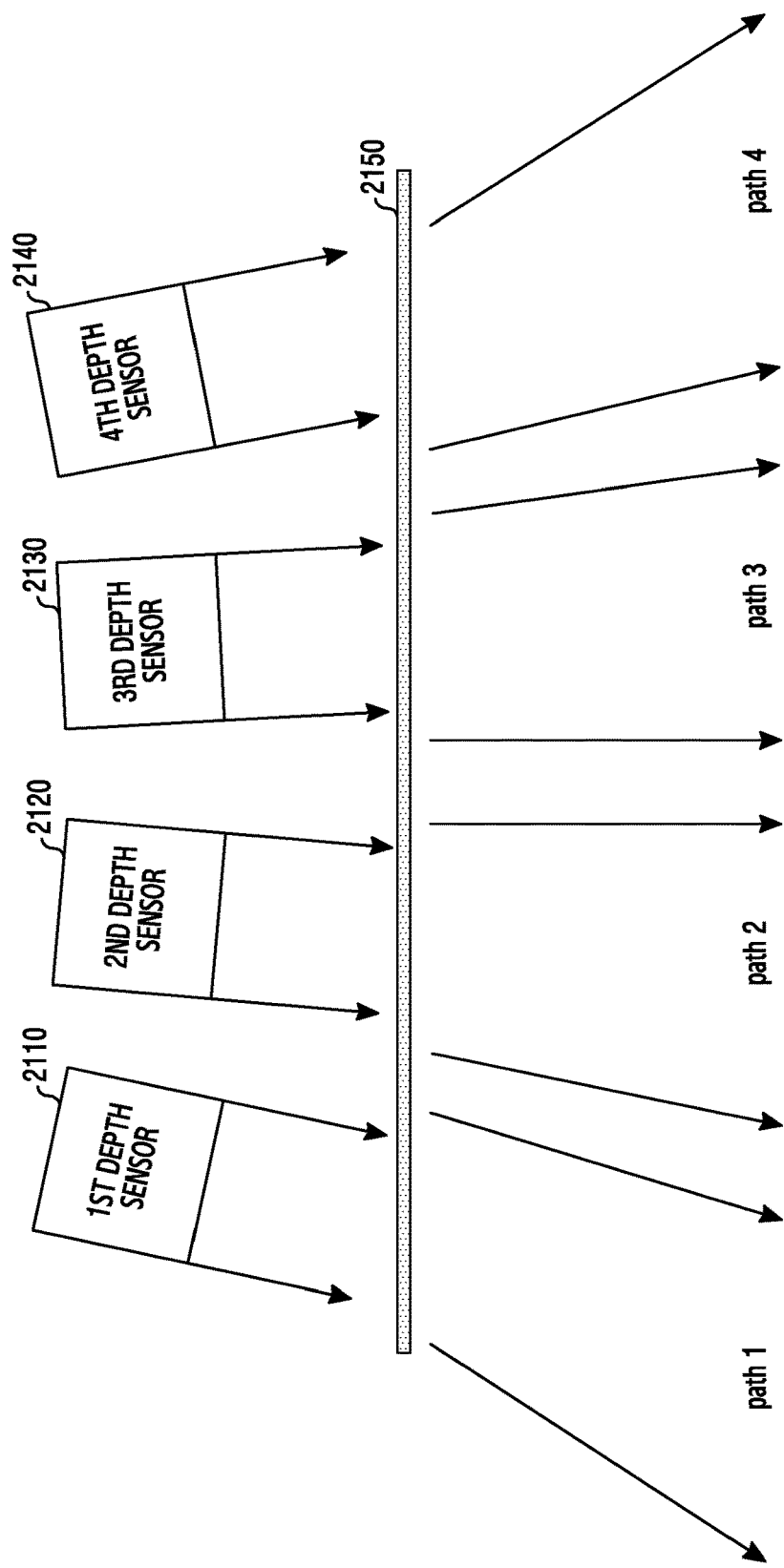

As illustrated in FIG. 21, the electronic device can be configured to sequentially arrange four depth sensors (e.g., a 1st depth sensor 2110, a 2nd depth sensor 2120, a 3rd depth sensor 2130, and a 4th depth sensor 2140). And, the electronic device can be configured to divide the coverage of each of regions (e.g., regions corresponding to a path 1, a path 2, a path 3, and a path 4), using a diffuser 2150 in front of the respective depth sensors 2110, 2120, 2130, and 2140. For example, if the depth sensor 2110, 2120, 2130, and 2140 are arranged on one PCB, the directivity of light can be all made the same as one another. Accordingly to this, in various example embodiments, to differently implement angles for the respective regions (e.g., the path 1, the path 2, the path 3, and the path 4), the electronic device can differently arrange and configure angles (or tilts) (e.g., beamforming directions) of the depth sensors.

Figure 22:
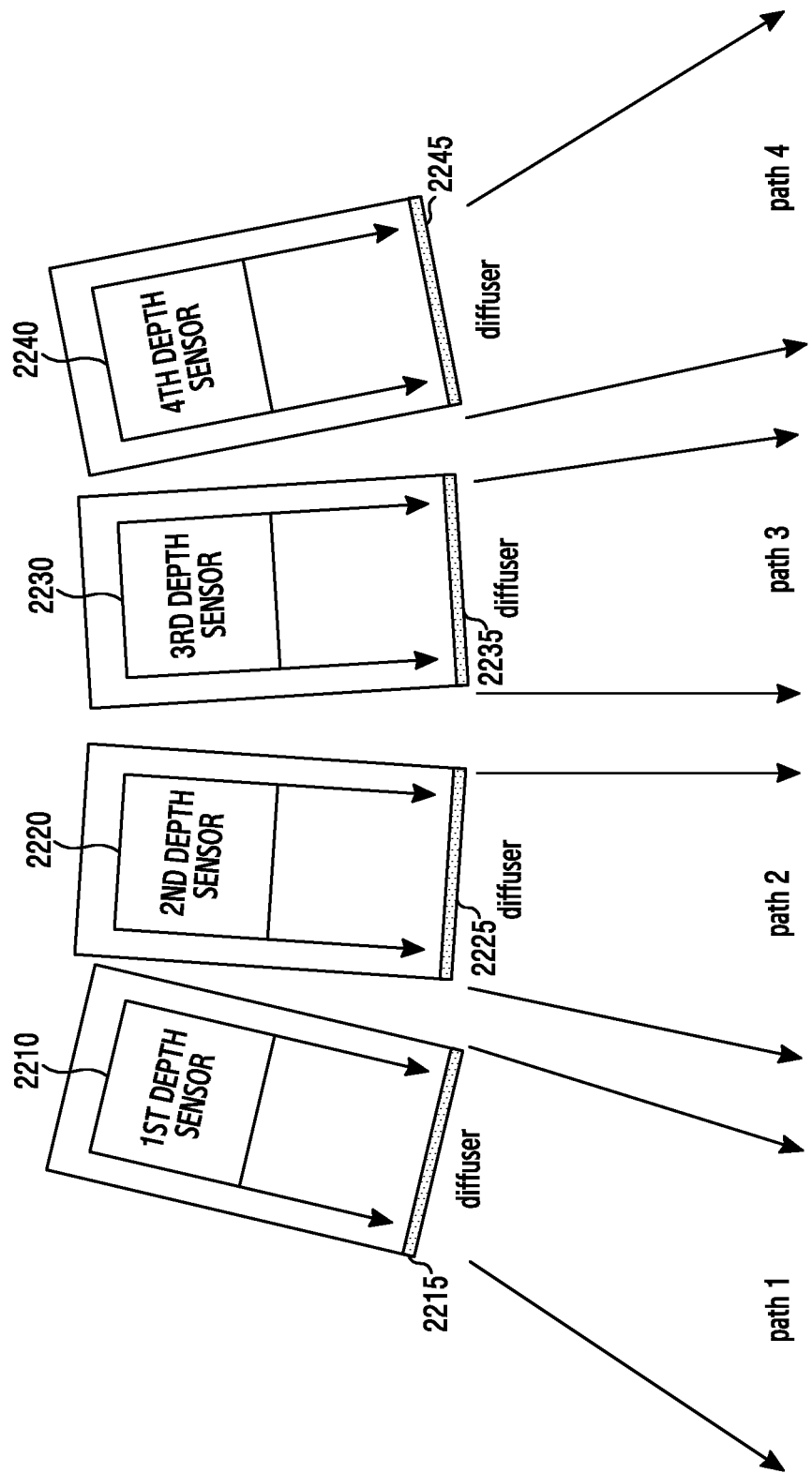

As illustrated in FIG. 22, the electronic device can be configured to arrange depth sensors (e.g., a 1st depth sensor 2210, a 2nd depth sensor 2220, a 3rd depth sensor 2230, and a 4th depth sensor 2240) and diffusers (e.g., a 1st diffuser 2215, a 2nd diffuser 2225, a 3rd diffuser 2235, and a 4th diffuser 2245), as one pair, respectively. And, the electronic device can be configured to differently arrange and configure angles (e.g., angles for respective regions) of the depth sensors, to distinguish the coverage of the respective regions (e.g., regions corresponding to the path 1, the path 2, the path 3, and the path 4).

Figure 23:
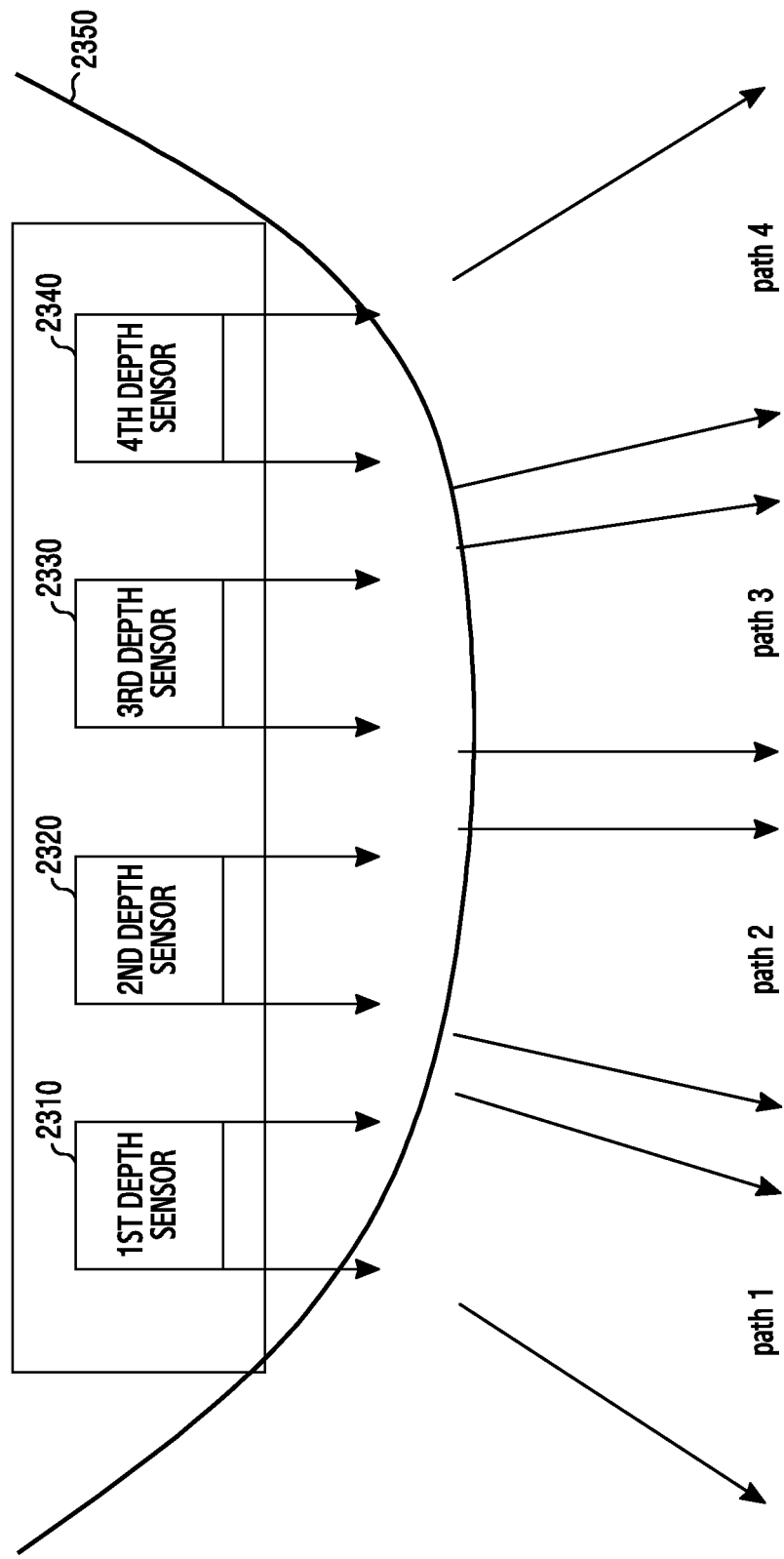

As illustrated in FIG. 23, the electronic device can be configured to sequentially arrange four depth sensors (e.g., a 1st depth sensor 2310, a 2nd depth sensor 2320, a 3rd depth sensor 2330, and a 4th depth sensor 2340) on each PCB. And, the electronic device can be configured to arrange and configure a diffuser 2350 in a curved shape of a set curvature to cover respective regions (e.g., a path 1, a path 2, a path 3, and a path 4) in front of the depth sensors 2310, 2320, 2330, and 2340, to distinguish the coverage of the respective regions (e.g., regions corresponding to the path 1, the path 2, the path 3, and the path 4).

Figure 24:
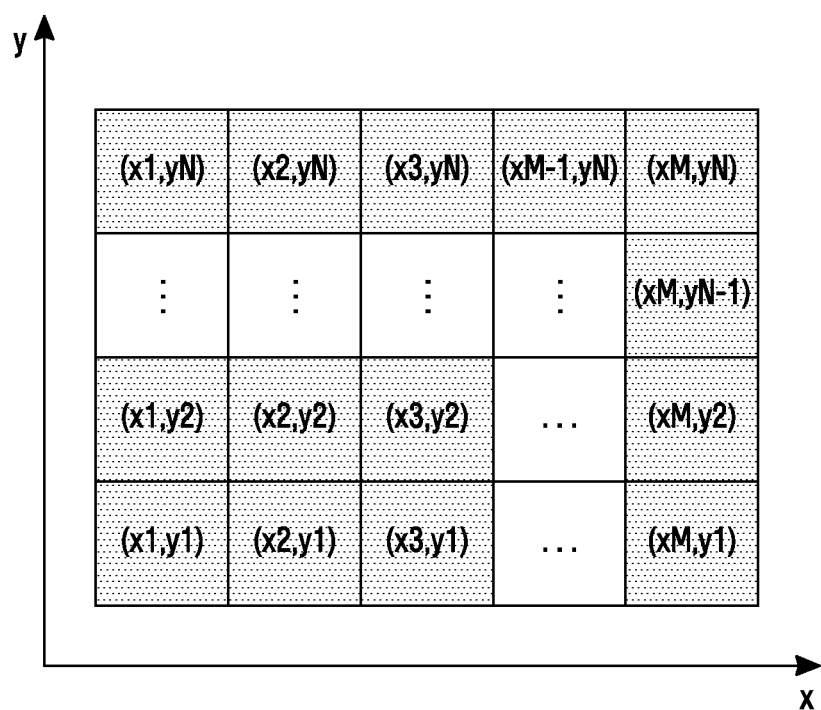
FIG. 24 is a graph illustrating an example of configuring a system for image photographing in an electronic device according to various example embodiments of the present disclosure.

FIG. 24 is a graph illustrating an example of configuring a system for image photographing in an electronic device according to various example embodiments of the present disclosure.

As illustrated in FIG. 24, according to various example embodiments, a depth sensor can be extended and applied to a vertical direction as well as a horizontal direction. According to various example embodiments, in a construction of FIG. 24, the electronic device can minutely or precisely control a Region Of Interest (ROI) according to a location of an object or a size (e.g., a height of a user) of the object. Also, according to various example embodiments, the electronic device can also decrease a spare region according to a movement of the object through more subdivided region dividing, and can resultantly decrease the power consumption of the whole system more effectively. Also, according to various example embodiments, the electronic device can decrease a range of a region that each depth sensor has to cover, and can also decrease a difference between center and edge regions of a beam shape. Accordingly, according to various example embodiments, the electronic device can increase the uniformity of beamforming in irradiating a light source.

FIG. 25, FIG. 26, FIG. 27, FIG. 28A, FIG. 28B, FIG. 29 and FIG. 30 are diagrams illustrating examples of the simulation result in an electronic device according to various example embodiments of the present disclosure.

Figure 25:
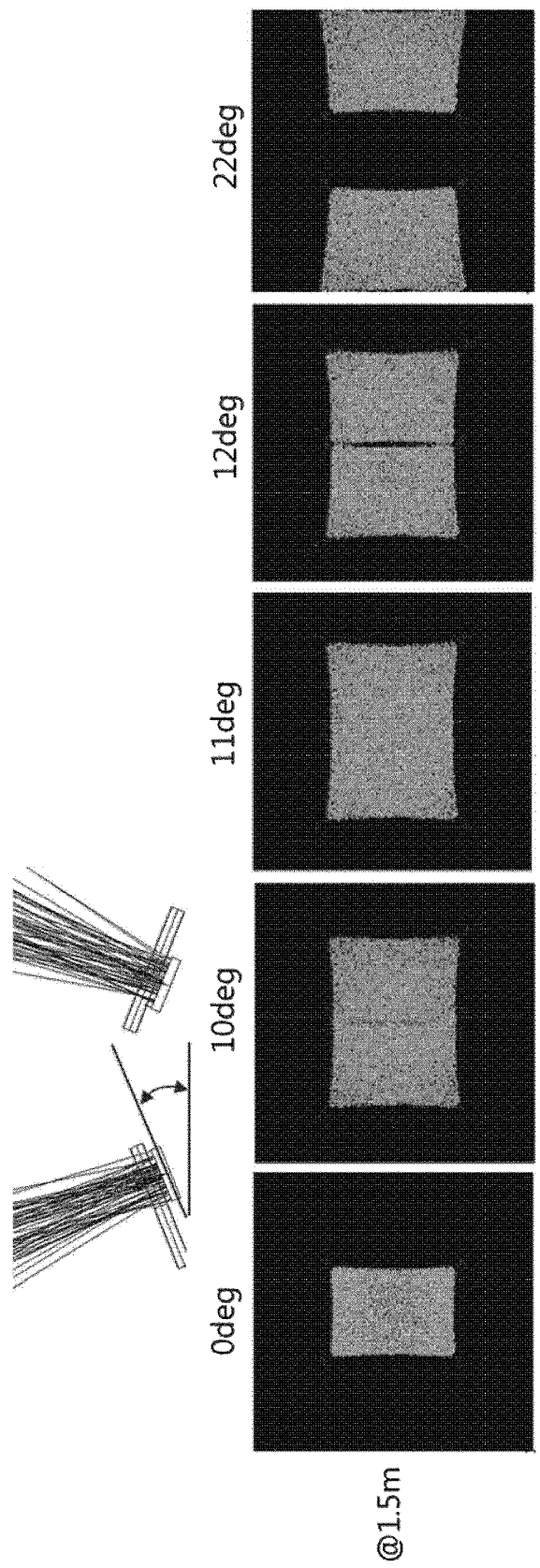

FIG. 25 illustrates the simulation result of examining a change of a coverage region dependent on a change (e.g., 0 degree, 10 degrees, 11 degrees, 12 degrees, and 22 degrees) of an angle between two pairs of depth sensors and diffusers. As in the example of FIG. 25, in various example embodiments, the electronic device can be designed to include the whole coverage by setting a suitable tilt angle in accordance with the number of depth sensors and locations thereof.

Figure 26:
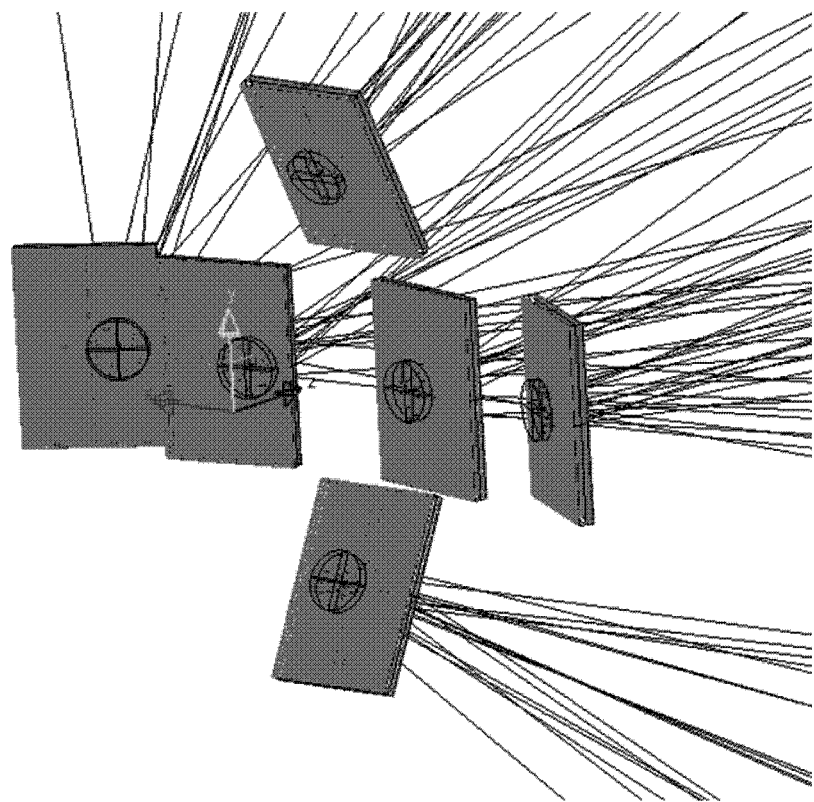
Figure 27:
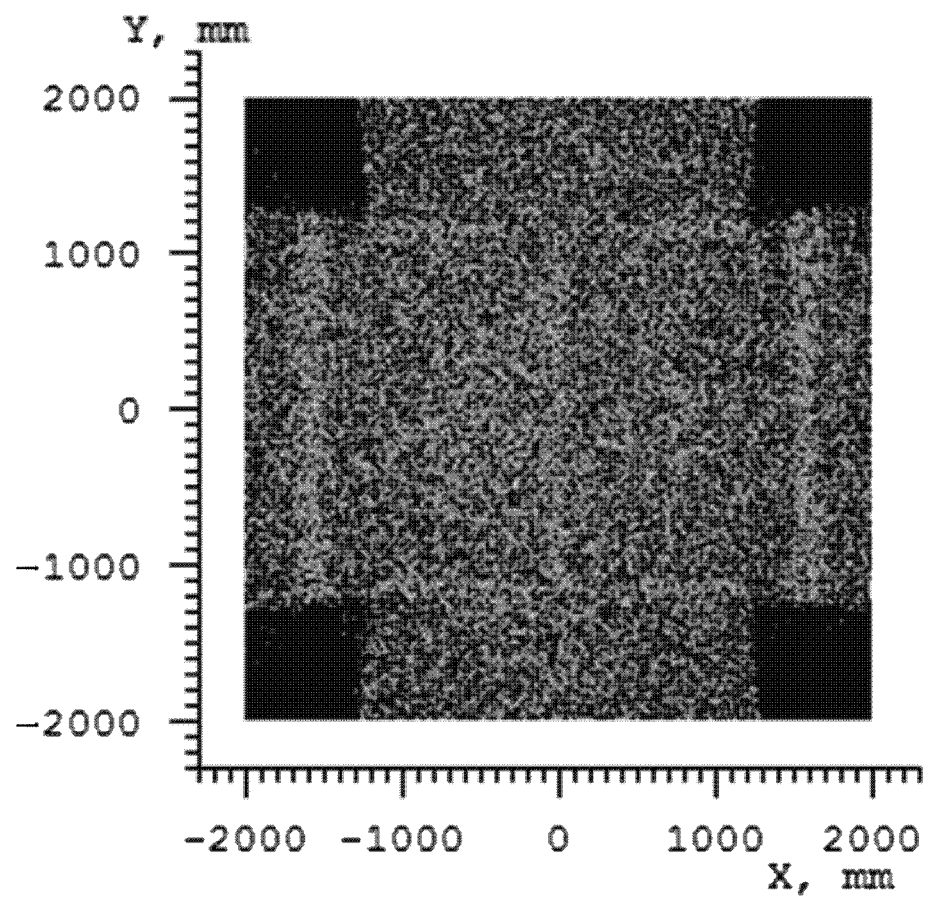

According to various example embodiments, the electronic device can extend to vertical-direction (e.g., Y-axis) division, besides horizontal-direction (e.g., X-axis) division described earlier with reference to FIG. 20 to FIG. 23. Also, as described earlier with reference to FIG. 24, the electronic device can extend to horizontal-direction and vertical-direction space division. Examples of the space division are illustrated in FIG. 26 and FIG. 27. For example, as illustrated in FIG. 26 and FIG. 27, it can be appreciated that a coverage region is subdivided and extended in various directions. Also, in accordance with various example embodiments, in case where the diffuser is configured in a circular shape, not a square shape, the diffuser can change into the circular shape as a coverage shape. Various example embodiments are possible.

Figure 28:
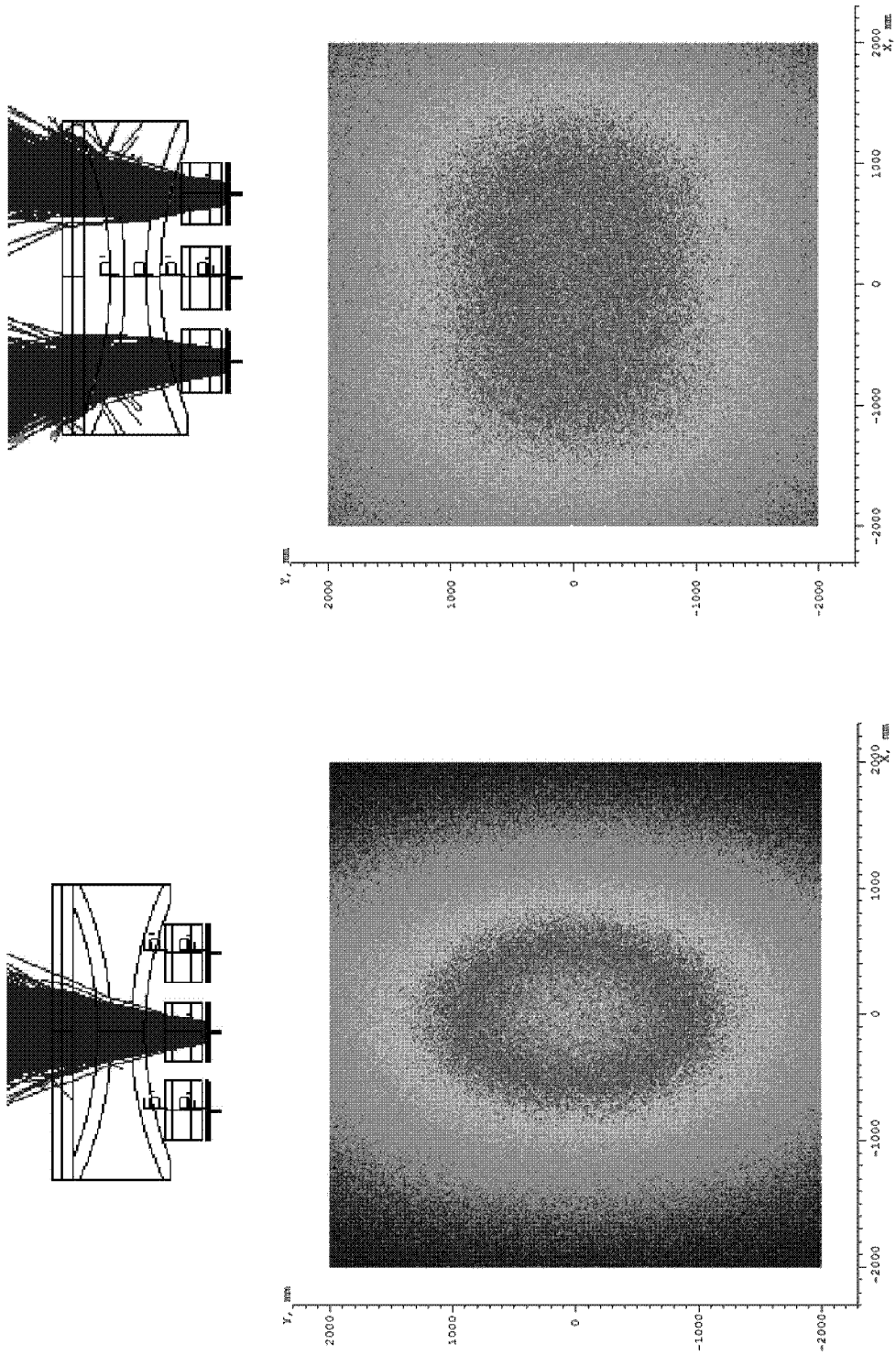

As illustrated in FIGS. 28A and 28B, FIG. 28A illustrates an example of a coverage region formed when one depth sensor works, and FIG. 28B illustrates an example of a coverage region formed when two depth sensors work. In accordance with various example embodiments, comparing the uniformity of full coverage with reference to FIG. 28A and FIG. 28B, it can be appreciated that the example of FIG. 28B in which two depth sensors work shows better coverage uniformity than the example of FIG. 28A in which one depth sensor works.

As above, in accordance with various example embodiments, the electronic device can adaptively control power for light source irradiation of a depth sensor, and can divide the full coverage of the depth sensor and perform image processing for a region of interest. By doing so, the electronic device can decrease the power consumption of the whole system and also, can improve the uniformity of the full coverage, too. Also, according to various example embodiments, the electronic device can guarantee a better quality even in an edge region of a camera photographing range.

Figure 30:
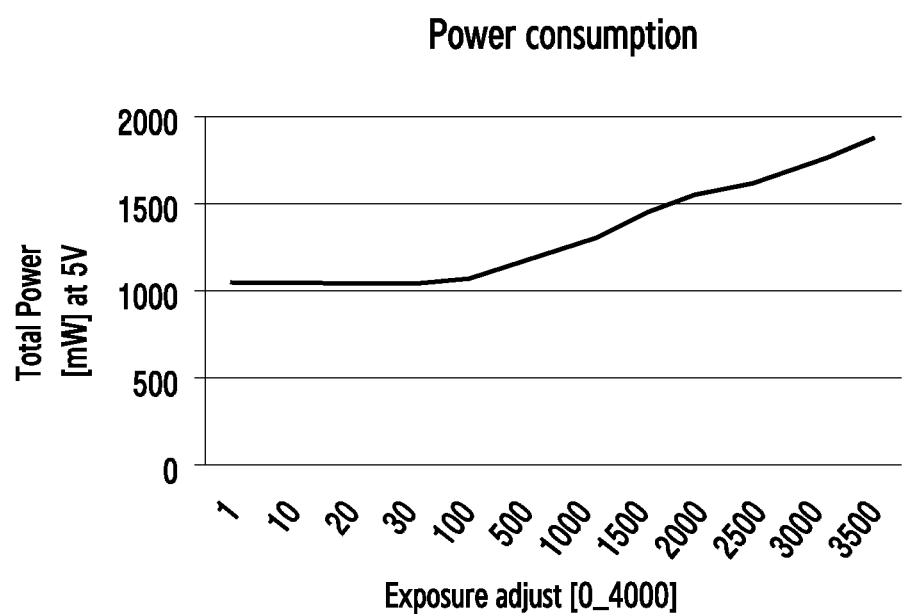

For example, FIG. 29 illustrates an example of an actually driven IR pulse waveform, using a depth camera (e.g., a TOF depth camera), in accordance with various example embodiments. And, FIG. 30 illustrates an example of a graph illustrating a power consumption result. As illustrated in FIG. 29 and FIG. 30, according to various example embodiments, power required for light source irradiation of the depth sensor can be set by controlling the number of pulses. For example, the electronic device 400 (e.g., depth camera system) according to various example embodiments can control an exposure count (e.g., the number of pulses), and can change the power in accordance with the controlling of the exposure count. In another method, the electronic device 400 can control the power by changing the amplitude of a pulse as well. According to one example embodiment, the electronic device 400 can determine a required minimal region, in accordance with depth information (e.g., location and/or distance) of an object. The electronic device 400 can determine the coverage for a minimal distance in accordance with a distance with the object, in the determined region. The electronic device 400 can set power of a corresponding depth sensor by optimized power, based on the result of determining the power of the corresponding depth sensor, to irradiate a light source. As a result, as illustrated in FIG. 30, the electronic device 400 can effectively decrease power consumption compared to the conventional scheme.

As described above, an electronic device and an operation method thereof according to various example embodiments can minimize power consumption resulting from light source irradiation in a system (e.g., a depth camera system or an electronic device including the same) in which 3-dimensional image photographing is possible, and decrease the power consumption of the whole system.

According to various example embodiments, the present disclosure can decrease power consumption to the extent that 3-dimensional image photographing is made possible even in a mobile electronic device working based on a battery. So, the present disclosure can be extended and applied to the mobile electronic device. Also, the conventional scheme is essentially difficult to guarantee the uniformity (e.g., decreasing a difference between center and edge portions) of an IR region. In contrast, various example embodiments of the present disclosure can guarantee the uniformity of a coverage region. Due to this, the performance (e.g., depth accuracy) of the whole system can be improved.

Various example embodiments of the present disclosure disclosed in the description and the drawings merely suggest various examples to easily explain the technological content of the present disclosure and to aid in the understanding of the present disclosure, and do not intend to limit the spirit and scope of the present disclosure. Accordingly, the scope of the present disclosure should be understood as including all modified or changed forms drawn on the basis of the technological spirit of the present disclosure, besides the example embodiments disclosed herein.

What is claimed is:

1. An electronic device comprising:
a plurality of light emitting diodes (LEDs);
a sensor; and
a processor,
wherein the processor is configured to:
control the plurality of LEDs to emit a plurality of lights having a first intensity with a first frequency,
in response to the controlling the plurality of LEDs, identify, via the sensor, at least one reflected light which is associated with at least one of the plurality of lights and is reflected from an external object;
in response to the identification of the at least one reflected light, control, among the plurality of LEDs, at least one of the LEDs corresponding to the identified at least one reflected light to emit at least one light having a second intensity with the first frequency, wherein the second intensity is lower than the first intensity; and
in response to the controlling the at least one of the LEDs, control, among the plurality of LEDs, another LED distinct from the at least one of the LEDs, to emit at least one light having the first intensity with a second frequency, wherein the second frequency is lower than the first frequency.

2. The electronic device of claim 1, wherein the controlled at least one of the LEDs to emit the at least one light having the second intensity with the first frequency is corresponding to a location of the external object, and
wherein the controlled another LED to emit at least one light having the first intensity with the second frequency is corresponding to another location distinct from the location.

3. The electronic device of claim 1, wherein the processor is configured to:
control, in response to identifying a movement of the external object, at least one of the another LED to emit at least one light having the second intensity with the first frequency.

4. The electronic device of claim 1, wherein the processor is configured to: identify the second intensity based on a distance between the external object and the sensor.

5. A method of operating an electronic device, the method comprising:
controlling a plurality of light emitting diodes (LEDs) of the electronic device to emit a plurality of lights having a first intensity with a first frequency,
identifying, in response to the controlling, by using a sensor of the electronic device, at least one reflected light which is associated with at least one of the plurality of lights and is reflected from an external object;
in response to the identification of the at least one reflected light, controlling, among the plurality of LEDs, at least one LED corresponding to the identified at least one reflected light to emit at least one light having a second intensity with the first frequency, wherein the second intensity is lower than the first intensity; and
in response to the controlling the at least one LED, controlling, among the plurality of LEDs, another LED distinct from the at least one LED to emit at least one light having the first intensity with a second frequency, wherein the second frequency is lower than the first frequency.

6. The method of claim 5, wherein the controlled at least one LED to emit the at least one light having the second intensity with the first frequency is corresponding to a location of the external object; and
wherein the controlled another LED to emit at least one light having the first intensity with the second frequency is corresponding to another location distinct from the location.

7. The method of claim 5, further comprising controlling, in response to identifying a movement of the external object, at least one of the another LED to emit at least one light having the second intensity with the first frequency.

8. The method of claim 7, further comprising identifying the second intensity based on a distance between the external object and the sensor.

* * * * *